(12) United States Patent
Ni et al.

(10) Patent No.: US 12,204,069 B2
(45) Date of Patent: Jan. 21, 2025

(54) INFORMATION PROCESSING DEVICE, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Fang Ni, Ota (JP); Hiromasa Shin, Yokohama (JP); Yoshiaki Shiga, Kawasaki (JP); Mitsuru Kakimoto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 80 days.

(21) Appl. No.: 17/653,901

(22) Filed: Mar. 8, 2022

(65) Prior Publication Data

US 2023/0081471 A1    Mar. 16, 2023

(30) Foreign Application Priority Data

Sep. 14, 2021    (JP) .................. 2021-149608

(51) Int. Cl.
*G01W 1/10*    (2006.01)

(52) U.S. Cl.
CPC .................... *G01W 1/10* (2013.01)

(58) Field of Classification Search
CPC .................................... G01W 1/10
See application file for complete search history.

(56) References Cited

U.S. PATENT DOCUMENTS

| 2013/0346523 A1* | 12/2013 | Praun | H04L 51/00 709/206 |
| 2014/0372360 A1* | 12/2014 | Asrani | G01W 1/10 340/870.07 |
| 2015/0212236 A1* | 7/2015 | Haas | G06T 7/337 382/100 |
| 2017/0004404 A1* | 1/2017 | Fujimura | G06N 20/00 |
| 2019/0303783 A1* | 10/2019 | Utsumi | G06N 7/00 |
| 2019/0385178 A1* | 12/2019 | Matsumoto | G06Q 30/0202 |

FOREIGN PATENT DOCUMENTS

| JP | 2005085110 A * | 3/2005 | ............. G08C 17/02 |
| JP | 2007-122203 A | 5/2007 | |
| JP | 4892145 B2 | 3/2012 | |
| JP | 6164872 B2 | 7/2017 | |
| JP | 2020-109381 A | 7/2020 | |
| WO | WO 2020/203854 A1 | 10/2020 | |

OTHER PUBLICATIONS

Japanese Notice of Allowance mailed Jul. 23, 2024, issued in Japanese Patent Application No. 2021-149608 (with English translation).

* cited by examiner

*Primary Examiner* — Yoshihisa Ishizuka

(74) *Attorney, Agent, or Firm* — Oblon, McClelland, Maier & Neustadt, L.L.P.

(57) ABSTRACT

According to one embodiment, an information processing device includes a first processor configured to calculate, based on first information indicating a target time point at which weather prediction data is to be acquired and which is a relative time point with respect to a first time point, second information indicating the target time point being a relative time point with respect to a second time point at which weather prediction is started by a prediction device, the prediction device being configured to generate weather prediction data through weather prediction.

9 Claims, 17 Drawing Sheets

|  | PREDICTION PRODUCT A | PREDICTION PRODUCT B | PREDICTION PRODUCT C |
|---|---|---|---|
| PREDICTION FREQUENCY | EVERY DAY | EVERY HOUR | EVERY DAY |
| PREDICTION START TIME POINT | 21:00 | ON THE HOUR | 21:00 |
| PERIOD FOR PREDICTION | 168 HOURS | 6 HOURS | 168 HOURS |
| TIME INTERVAL OF OUTPUT VALUES | 10 MINUTES | 10 MINUTES | 10 MINUTES |
| MESH SIZE | 9km | 1km | 1km |
| DATA GENERATION PERIOD | 6 HOURS | 30 MINUTES | 6 HOURS |
| PERIOD DURING WHICH DATA EXISTS | 2010/1/1 TO PRESENT | 2010/1/1 TO PRESENT | 2010/1/1 TO PRESENT |
| POINT | ALL AMEDAS POINTS | ALL AMEDAS POINTS | ALL RIVER OBSERVATION POINTS OF MINISTRY OF LAND, INFRASTRUCTURE, TRANSPORT AND TOURISM |
| WEATHER VARIABLE | APPROXIMATELY 200 TYPES IN TOTAL SUCH AS TEMPERATURE, PRECIPITATION AMOUNT, AMOUNT OF SOLAR IRRADIANCE, WIND SPEED, WIND DIRECTION, TURBULENT INTENSITY AND ATMOSPHERE PRESSURE | ONLY PRECIPITATION AMOUNT | RIVER FLOW RATE AND RIVER LEVEL |

FIG. 3

TIME POINT PROCESSING RESULT

• PREDICTION PRODUCT A
LIST OF AVAILABLE PERIODS FOR PREDICTION
1. 27h~51h (n=1) ◎
2. 51h~75h (n=2)
3. 75h~99h (n=3)
4. 99h~123h (n=4)
5. 123h~147h (n=5)

• PREDICTION PRODUCT B
LIST OF AVAILABLE PERIODS FOR PREDICTION
NONE

• PREDICTION PRODUCT C
LIST OF AVAILABLE PERIODS FOR PREDICTION
1. 27h~51h (n=1) ◎
2. 51h~75h (n=2)
3. 75h~99h (n=3)
4. 99h~123h (n=4)
5. 123h~147h (n=5)

• REFERENCE TIME POINT
17:00

• PERIOD FOR PREDICTION FROM REFERENCE TIME POINT
7h~31h

[TRANSMISSION]

FIG. 4A

TEMPORARILY RECORD n = 1 (27 h TO 51 h) OF PREDICTION PRODUCT A AND n = 1 (27 h TO 51 h) OF PREDICTION PRODUCT C ON DISTRIBUTION SERVER SIDE

FIG. 4B

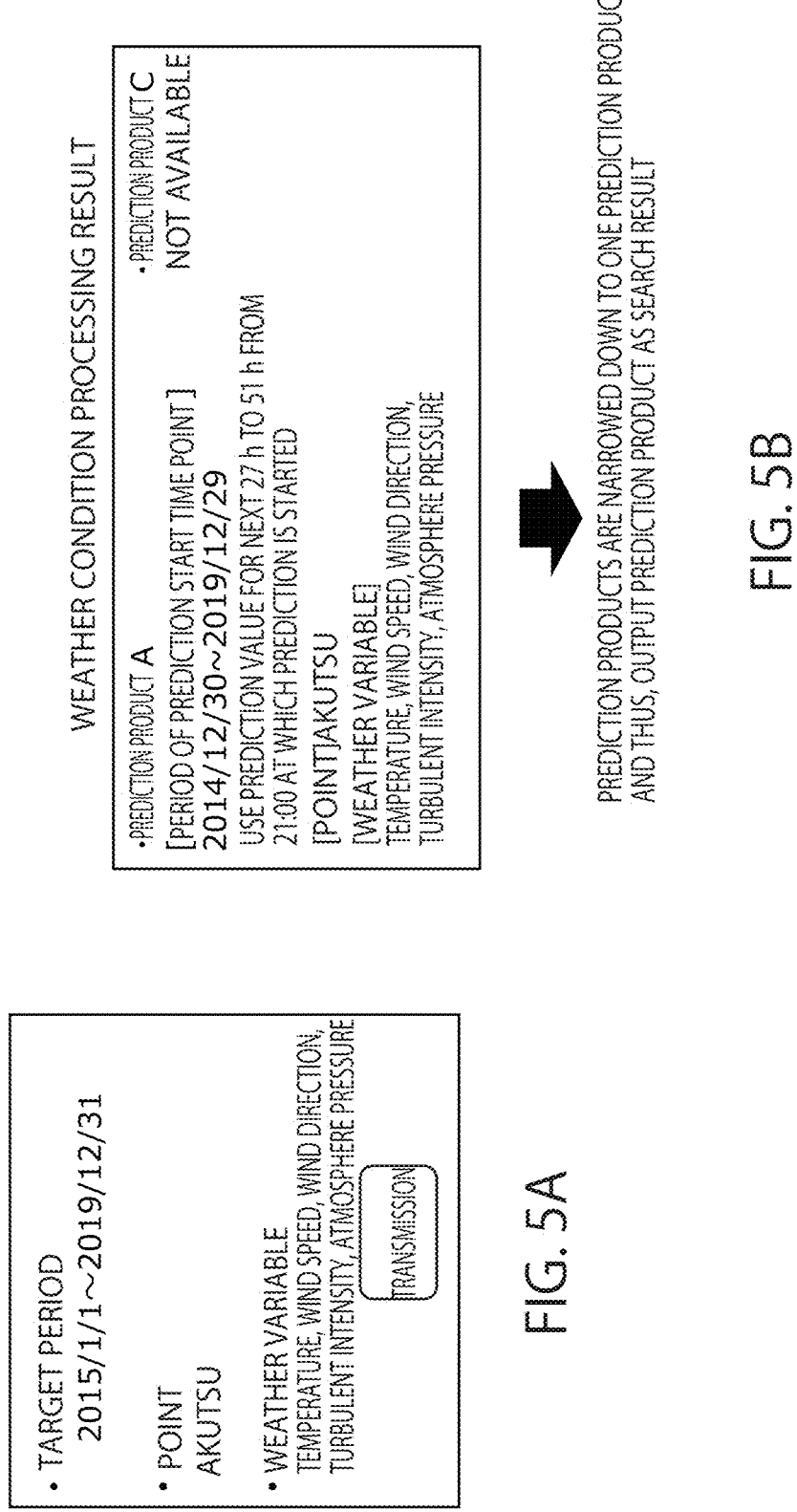

WEATHER CONDITION PROCESSING RESULT

- PREDICTION PRODUCT A
 [PERIOD OF PREDICTION START TIME POINT]
 2014/12/31~2019/12/30
 USE PREDICTION VALUE OF NEXT 9 h TO 99 h
 FROM 21:00 AT WHICH PREDICTION IS STARTED
 [POINT] KAMIOKA
 [WEATHER VARIABLE]
 PRECIPITATION AMOUNT, TEMPERATURE, AMOUNT OF
 SOLAR IRRADIANCE

- PREDICTION PRODUCT C
 [PERIOD]
 2014/12/31~2019/12/31
 USE PREDICTION VALUE OF NEXT 9 h TO 99 h
 FROM 21:00 AT WHICH PREDICTION IS STARTED
 [POINT] NAKAYAMABASHI
 [WEATHER VARIABLE]
 RIVER FLOW RATE, RIVER LEVEL

WHILE THERE ARE TWO PREDICTION PRODUCTS, THERE IS NO OVERLAPPING POINTS AND WEATHER VARIABLES, AND THUS, OUTPUT BOTH AS SEARCH RESULT INFORMATION

FIG. 7B

- TARGET PERIOD
 2015/1/1~2019/12/31

- POINT
 KAMIOKA, NAKAYAMABASHI

- WEATHER VARIABLE
 PRECIPITATION AMOUNT, TEMPERATURE, AMOUNT OF
 SOLAR IRRADIANCE, RIVER FLOW RATE, RIVER LEVEL

[TRANSMISSION]

FIG. 7A

CONTENT OF KAMIOKA_TEMPERATURE.csv

| META INFORMATION OF PREDICTION PRODUCT | REFERENCE TIME POINT | 0:00 LATER | 0:10 LATER | ... | 2:50 LATER | 3:00 LATER |
|---|---|---|---|---|---|---|
| PREDICTION PRODUCT NAME: PREDICTION PRODUCT A | 2015/1/1 0:00 | 3.35 | 3.89 | | 4.764 | 5.635 |
| PREDICTION START TIME POINT: 21:00 EVERY DAY | 2015/1/2 0:00 | 3.75 | 3.675 | | 4.87 | 5.987 |
| PERIOD FOR PREDICTION: NEXT 27 h TO 30 h | 2015/1/3 0:00 | 3.89 | 3.234 | | 4.987 | 6.63 |
| | ... | | | | | |
| | 2015/12/29 0:00 | 3.234 | 4.764 | | 5.987 | 7.123 |
| DATA PERIOD | 2015/12/30 0:00 | 3.765 | 4.87 | | 6.63 | 7.76 |
| 2014/12/30~2015/12/29 | 2015/12/31 0:00 | 4.764 | 4.987 | | 6.987 | 6.987 |

WEATHER CONDITION PROCESSING RESULT
(PROCESSING EXAMPLE OF n = 1 FOR PREDICTION PRODUCTS A TO C)

- PREDICTION PRODUCT A
  [PERIOD]
  2014/12/30~2015/12/29
  USE PREDICTION FOR NEXT 27 h TO 30 h FROM 21:00
  AT WHICH PREDICTION IS STARTED
  [POINT] KAMIOKA
  [WEATHER VARIABLE] PRECIPITATION AMOUNT, TEMPERATURE, AMOUNT OF SOLAR IRRADIANCE

- PREDICTION PRODUCT B
  [PERIOD]
  2014/12/31~2015/12/30
  USE PREDICTION FOR NEXT 1 h TO 4 h FROM
  23:00 AT WHICH PREDICTION IS STARTED
  [POINT] KAMIOKA
  [WEATHER VARIABLE] PRECIPITATION AMOUNT

- PREDICTION PRODUCT C
  [PERIOD]
  2014/12/30~2015/12/29
  USE PREDICTION FOR NEXT 27 h TO 30 h FROM 21:00
  AT WHICH PREDICTION IS STARTED
  [POINT] NAKAYAMABASHI
  [WEATHER VARIABLE] RIVER FLOW RATE, RIVER LEVEL

APPLY SIMILAR PROCESSING TO ALL n IN FIG. 14(B)
AND OUTPUT AS SEARCH RESULT

FIG. 15B

- TARGET PERIOD
  2015/1/1~2015/12/31

- POINT
  KAMIOKA, NAKAYAMABASHI

- WEATHER VARIABLE
  PRECIPITATION AMOUNT, TEMPERATURE, AMOUNT OF
  SOLAR IRRADIANCE, RIVER FLOW RATE, RIVER LEVEL

[TRANSMISSION]

FIG. 15A

INFORMATION PROCESSING DEVICE, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-149608, filed on Sep. 14, 2021, the entire contents of which are incorporated herein by reference.

FIELD

Embodiments of the present invention relate to an information processing device, an information processing method, and a non-transitory computer readable medium.

BACKGROUND

There is online prediction which is intended to predict an event an arbitrary period after a certain reference time point, such as power generation amount prediction, energy demand prediction and disaster prediction. In the online prediction, it is effective to perform machine learning using feature amounts relating to weather (or meteorology) as explanatory variables. An event can be predicted by inputting a weather prediction value to a prediction model generated through machine learning. The prediction model is constructed through machine learning using past weather prediction data. While it is ideal to use optimal past weather prediction data to construct a machine learning model, it is difficult for a person other than a weather expert to specify past weather prediction data optimal for model learning due to a lack of expertise.

BRIEF DESCRIPTION OF THE DRAWINGS

FIG. 3 is a diagram illustrating an example of meta information stored in a metadata storage for each prediction product;

FIGS. 4A and 4B each is a diagram for explaining a first usage example of the system in FIG. 1;

FIGS. 5A and 5B each is a diagram for explaining the first usage example of the system in FIG. 1;

FIGS. 7A and 7B each is a diagram for explaining the second usage example of the system in FIG. 1;

FIGS. 15A and 15B each is a diagram for explaining a usage example of the system according to the second embodiment;

DETAILED DESCRIPTION

According to one embodiment, an information processing device includes a first processor configured to calculate, based on first information indicating a target time point at which weather prediction data is to be acquired and which is a relative time point with respect to a first time point, second information indicating the target time point being a relative time point with respect to a second time point at which weather prediction is started by a prediction device, the prediction device being configured to generate weather prediction data through weather prediction.

Embodiments of the present invention will be described below with reference to the drawings.

First Embodiment

Figure 1:
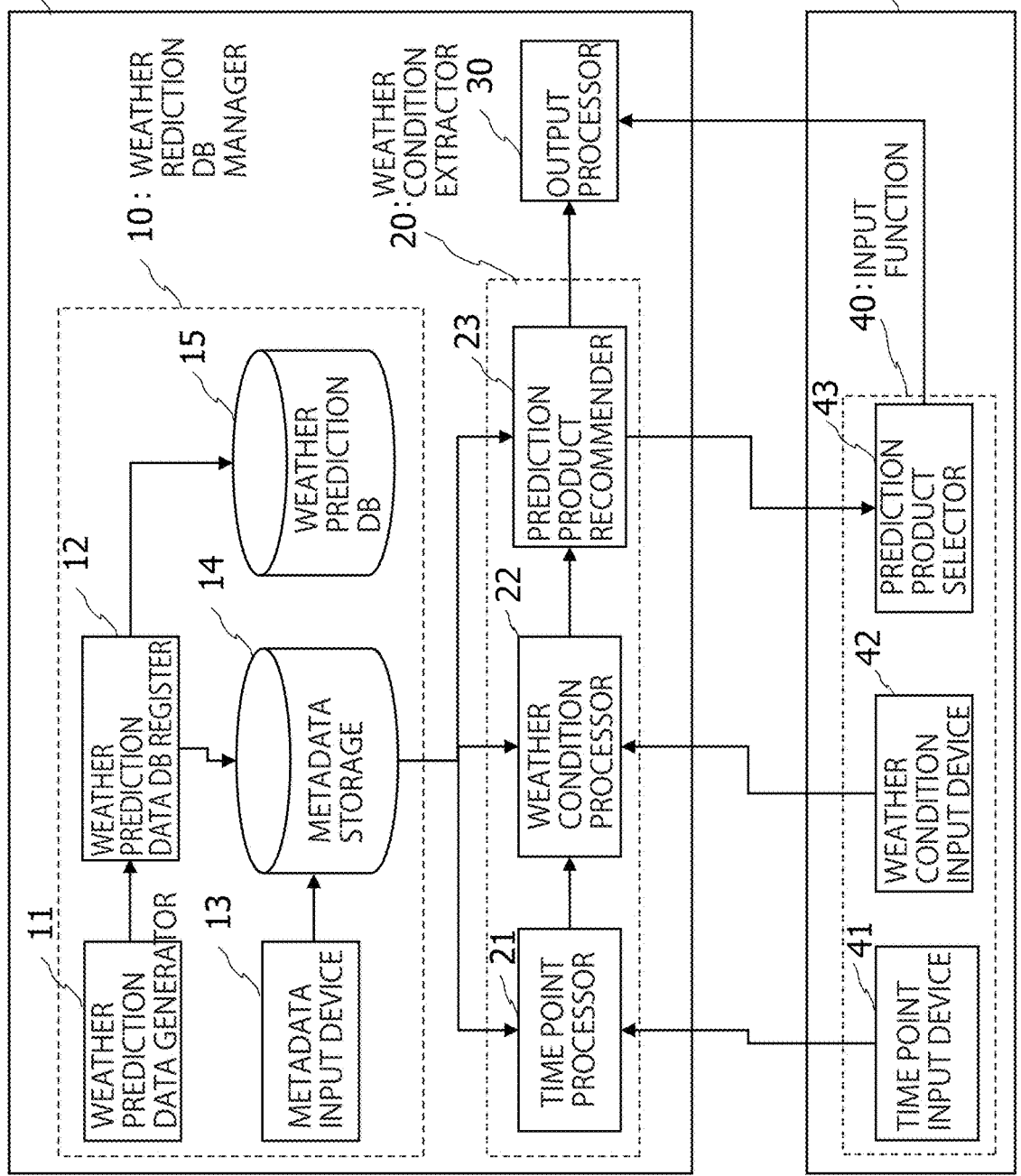
FIG. 1 is a block diagram of an information processing system according to a first embodiment.

FIG. 1 is a block diagram of an information processing system according to a first embodiment. The system in FIG. 1 includes a distribution server 100 which is an information processing device according to the present embodiment and a client terminal 400. The distribution server 100 and the client terminal 400 can communicate data or information with each other via a wired or wireless communication network. The communication network may be either a wide area network such as the Internet or a local network such as a wireless local area network (LAN). Each of the distribution server 100 and the client terminal 400 can be constituted using a typical computer having an input function, an output function, a control function, a storage function and a communication function. The distribution server 100 includes a receiver configured to receive data or information from the client terminal 400 and a transmitter configured to transmit data or information to the client terminal 400.

The distribution server 100 includes a weather prediction DB manager 10, a weather condition extractor 20, and an output processor 30. The weather prediction DB manager 10 includes a weather prediction data generator 11, a weather prediction data DB register 12, a metadata input device 13, a metadata storage 14, and a weather prediction DB 15. The weather condition extractor 20 includes a time point processor 21 (first processor), a weather condition processor 22 (second processor), and a prediction product recommender 23 (prediction device recommender).

The client terminal 400 includes an input device 40. The input device 40 includes a time point input device 41, a weather condition input device 42, and a prediction product selector 43.

Basic processing flow in the present embodiment will be described. A user who is an operator of the client terminal 400 inputs various kinds of information, conditions, or the like, required for acquiring past weather prediction data (or meteorological prediction data) using the input device 40. The input information, conditions, or the like, are transmitted from the client terminal 400 to the distribution server 100 as input information. The distribution server 100 performs processing in accordance with processing algorithm on the basis of the input information received from the client terminal 400 and meta information regarding one or a plurality of prediction products stored in the metadata storage 14. The prediction product, which is a product, service, a program, or the like, that generates weather prediction data through weather prediction in accordance with meta information, is an example of a prediction device that generates weather prediction data through weather prediction. The distribution server 100 transmits information on the prediction product that generates weather prediction data to be provided to the user and output information that specifies a data portion to be provided to the user among the weather prediction data generated by the prediction product to the client terminal 400 as a processing result. The output information includes, for example, information identifying a range (position) of a period during which the weather prediction data is to be acquired, weather variables (or meteorological variables), points, or the like. The user acquires the weather prediction data from the distribution server 100 in accordance with the output information and predicts an event using the acquired weather prediction data as input data to a prediction model of an event (first event). The prediction model regarding an event may be generated through machine learning using the weather prediction data, and an event may be predicted using the generated prediction model. Examples of the event can include a power generation amount, energy demand or whether or not a disaster occurs or a possibility of occurrence of a disaster, or the like. As the prediction model, for example, an arbitrary regression model such as, for example, a neural network, a multiple regression model, a logistic regression model and a decision tree can be used.

The weather prediction data generator 11 of the distribution server 100 generates the weather prediction data for each prediction product by executing weather prediction in accordance with the meta information (see FIG. 3 which will be described later) of each prediction product.

The weather prediction data DB register 12 stores the generated weather prediction data in the weather prediction DB 15 in association with a weather prediction start time point (see FIG. 3 which will be described later). The weather prediction data generated for each prediction product is stored in the weather prediction DB 15 in association with the weather prediction start time point.

The metadata input device 13 inputs meta information of each prediction product to be registered in the metadata storage 14. The metadata storage 14 stores the meta information input from the metadata input device 13 for each prediction product.

The metadata storage 14 and the weather prediction DB 15 are storage devices such as memory devices and hard disk devices which temporarily or permanently store data or information.

Figure 2:
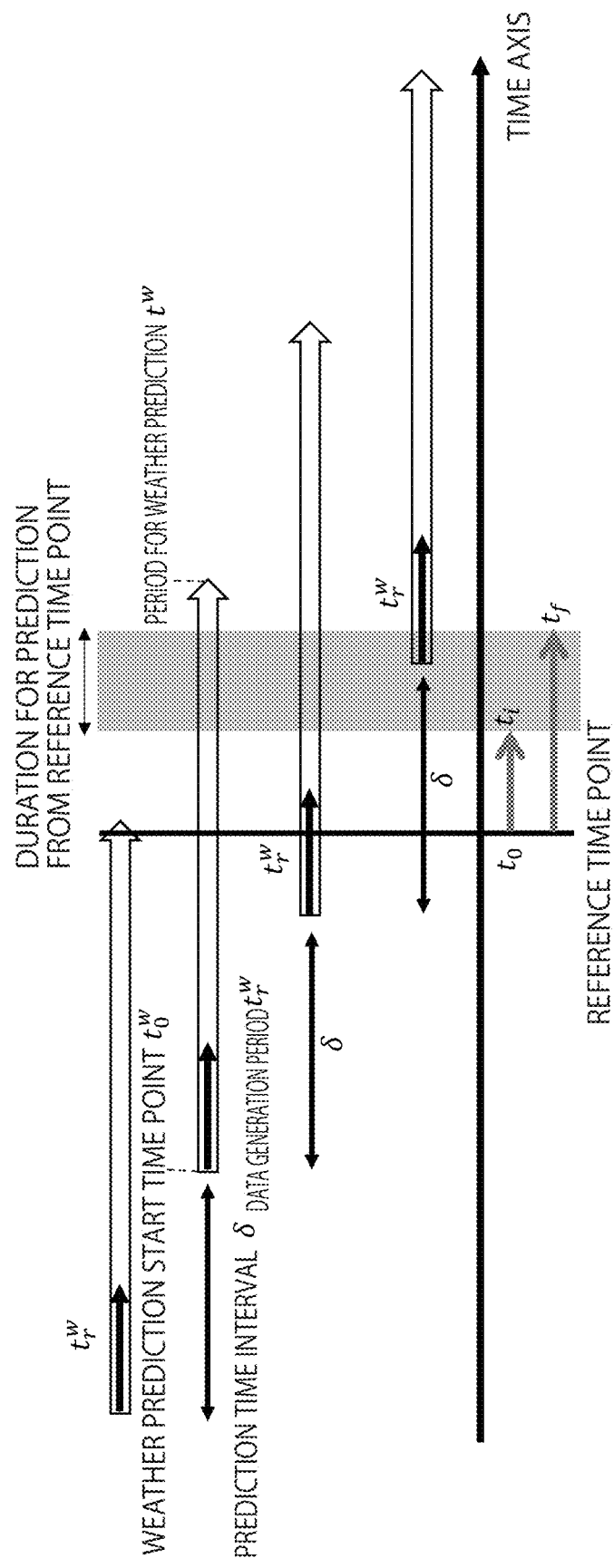
FIG. 2 is a diagram illustrating information regarding various kinds of time points or periods to be used in the present embodiment.

FIG. 2 is a diagram illustrating information regarding various kinds of time points and periods to be used in the present embodiment. Information to be input from the time point input device 41 of the client terminal 400 will be described with reference to FIG. 2.

Examples of the information to be input from the time point input device 41 includes the following information.

A reference time point $t_0$ (a first time point which becomes a reference)

An input format is, for example, time and minute (HH:MM) or may be time, or time, minute and second.

A period for prediction $[t_i, t_f]$ from the reference time point (a target period or a target time point based on the first time point)

$t_i$ is a time point at which the period for prediction is started (time point for prediction), and $t_f$ is a time point at which a duration for prediction ends. In a case where the period for prediction (target period) is one time point (that is, a target time point), it is only necessary to set $t_i = t_f$. While a case of a target period will be mainly described below, description can be interpreted in a similar manner also in a case of a target time point by reading a target period as a target time point. The target period includes a plurality of target time points.

A preparation period $t_{ML}$

The preparation period is, for example, a period required for executing a prediction model of an event (a period required from when execution of the prediction model is started until when a prediction result is output) (not illustrated in FIG. 2). In a case where a prediction model is generated, the preparation period may include a period required for generating the prediction model. In a case where there is no input of a preparation period, it is only necessary to set the preparation period as 0.

Information to be used at the time point processor 21 among the meta information stored in the metadata storage 14 will be described with reference to FIG. 2. The time point processor 21 is a first processor that processes information input from the time point input device 41. The meta information of each prediction product is stored in the metadata storage 14. The following information is stored as the meta information to be used at the time point processor 21.

A weather prediction start time point $t^w_0$ (a second time point at which weather prediction is started)

The weather prediction start time point $t^w_0$ is, for example, 21 o'clock every day, every hour, or the like.

A period for weather prediction $t^w$ (a period during which weather prediction is to be performed)

The period for weather prediction $t^w$ is, for example, 168 hours in a case of predicting weather in 168 hours from start of weather prediction.

A prediction time interval $\delta$ (a cycle, an inverse of a prediction frequency. It is assumed that a prediction frequency on a daily basis is an integer)

The prediction time interval $\delta$ corresponds to a time interval of the weather prediction start time points. For example, in a case where prediction is performed every 24 hours, the prediction time interval is 24 hours.

A data generation period of weather prediction data $t^w_r$ (including a processing period before and after weather prediction is started, a data transfer period of the generated weather prediction data, or the like)

The data generation period of the weather prediction data $t^w_r$ is a period required for generating the weather prediction data from the weather prediction start time point. For example, in a case where the weather prediction data of the period for prediction is generated 30 minutes after the weather prediction start time point, the data generation period is 30 minutes.

FIG. 3 illustrates an example of the meta information for each prediction product stored in the metadata storage 14. The above-described weather prediction start time point (in FIG. 3, expressed as a prediction start time point), the period for prediction, the prediction time interval (in FIG. 3, expressed as a prediction frequency), and the weather prediction data generation period (in FIG. 3, expressed as a data generation period) are stored. Other information will be described later.

The time point processor 21 performs processing in the following four steps X1 to X4 on the basis of the input information of the time point input device 41 and the meta information of the metadata storage 14.

(Step X1)

A gap between the reference time point to and the weather prediction start time point $t^w_0$ is standardized. Specifically, the gap is standardized so that $t_0 - t^w_0$ has a cycle δ. Thus, an integral multiple of δ is added to $t_0$ so that $t_0 + t_i - t^w_0$ belongs to a range [0, δ]. Through this operation, $t_0 + t_i - t^w_0$ (where $t_0$ is a value obtained by adding an integral multiple of δ to original $t_0$) means the time point for prediction $t_i$ seen from the most recent weather prediction start time point.

(Step X2)

A list of available prediction start time points is generated for each prediction product. Specifically, a list of integers n which satisfy $$t_{ML} + t_r^w \leq t_0 - t_0^w + n\delta \leq t^w - t_f \quad (1)$$

is obtained.

An inequality on the left side means that the weather prediction data can be acquired until a time point (reference time point) at which the user uses the weather prediction data. An inequality on the right side means that the weather prediction data (weather prediction value) exists within the period for prediction from the reference time point. In other words, it means that the period for prediction designated by the user is included in the period for prediction (prediction period). Note that a case is assumed in the present embodiment where the weather prediction data within the period for prediction is required for predicting an event in the period for prediction.

(Step X3)

An optimal weather prediction start time point is specified for each prediction product. Specifically, a minimum n is extracted from the list of the integers n obtained in step X2. The minimum n, for example, corresponds to the prediction start time point which is the closest to the reference time point among a plurality of prediction start time points corresponding to a plurality of integers n. Use of the prediction start time point enables use of the most recent weather prediction value, so that improvement in prediction accuracy of an event can be expected. In this manner, the time point processor 21 detects a prediction start time point for which the period for prediction designated by the user is within the period for weather prediction (prediction period) and which is the closest to the reference time point among a plurality of prediction start time points (second time points). The time point processor 21 calculates the period for prediction (prediction period) based on the weather prediction start time point in the next step X4 on the basis of the detected prediction start time point.

(Step X4)

The period for prediction $[t^w_i, t^w_f]$ from the weather prediction start time point (a target period or a target time point based on the second time point) is obtained for the minimum n extracted in step X3. $t^w_i$ and $t^w_f$ are calculated using the following expressions.

$$t_i^w = n\delta + t_0 + t_i - t_0^w \quad (2a)$$

$$t_f^w = n\delta + t_0 + t_f - t_0^w \quad (2b)$$

$t^w_i$, $t^w_f$ calculated for each prediction product is temporarily or permanently stored in an arbitrary storage within the distribution server 100 or an external storage device which can be accessed from the distribution server 100.

The information to be input from the weather condition input device 42 includes a condition regarding a period during which the weather prediction data is to be acquired, a condition regarding a target weather variable (first condition), a condition regarding a target point (second condition), and the like. The user may input information (third information) which designates the target weather variable as the first condition. Further, the user may input information (fourth information) which designates the target point as the second condition. The first condition and the second condition may be other conditions.

In the present embodiment, examples of the information to be input from the weather condition input device 42 specifically include the following information.

A target period during which past weather prediction data is to be acquired (an input period or a target period)

The input period is designated by, for example, start year, month and date and end year, month and date. However, the input period may be designated in other formats such as year, month, date and time or year and month.

A target weather variable

Examples of the weather variable include a temperature, humidity, or the like. One or a plurality of weather variables are input.

A target point

Examples of the point include Tokyo, Yokohama, or the like. A plurality of points can be input. The weather variable may be designated for each point. The weather variable common to a plurality of points may be designated.

Note that in a case where the target weather variable or the target point is determined in advance, there can be a case where input of the target weather variable or the target point is omitted.

An example of information to be used at the weather condition processor 22 among the meta information of each prediction product stored in the metadata storage 14 will be described with reference to FIG. 3. The weather condition processor 22 is a second processor that processes information input from the weather condition input device 42.

A period during which the weather prediction data exists (a period during which the weather data predicted in the past is acquired or a period during which weather prediction is performed). Note that the weather prediction data is stored in the weather prediction DB 15 in association with the prediction start time point, and in a case where the periods for prediction overlap, a plurality of weather prediction values exist for the same time point.

One or more weather variables (weather variable list)

One or more points (point list)

The weather condition processor 22 performs the following processing in steps Y1 and Y2 on the basis of $t^w_i$ and $t^w_f$ for each prediction product which is the output information of the time point processor 21, and the input information of the weather condition input device 42. The processing in steps Y1 and Y2 may be performed in reverse order.

(Step Y1)

Whether or not the input period (period during which the weather prediction data is to be acquired) is included in the period during which the weather prediction data exists is checked. Specifically, the target period including one or more prediction start time points is calculated with the following expression (3) using $t^w_i$ and $t^w_f$. Calculation is performed for each prediction product.

Year, month and date at which input is started–$t^w_i$ to
year, month and date at which input ends–$t^w_i$ (3)

If the target period (the period during which the weather prediction data is to be acquired) calculated using expression (3) is included in the period during which the weather prediction data exists, information indicating the target period is temporarily or permanently stored. The information indicating the target period is stored in an arbitrary storage within the distribution server 100 or an external storage device which can be accessed from the distribution server 100. If the target period calculated using expression (3) is not included in the period during which the weather prediction data exists, the weather prediction data to be generated with the prediction product is made an exception for acquisition.

(Step Y2)

A prediction product which satisfies the first condition regarding the weather variable and the second condition regarding the point is specified on the basis of the input points and weather variables. Specifically, the input points and weather variables are searched for in the point list and the weather variable list. Specifically, it is determined whether the weather variables and the points input by the user are included in the point list and the weather variable list for each prediction product for which the target period is stored in step Y1. If the weather variables and the points are included in the point list and the weather variable list, information indicating the corresponding prediction product and information indicating the corresponding one or more points and one or more weather variables are temporarily or permanently stored. The information indicating the corresponding points and the weather variables is stored in an arbitrary storage within the distribution server 100 or an external storage device which can be accessed from the distribution server 100.

As described above, the information indicating the target period and the information indicating the points and the weather variables searched for from the point list and the weather variable list are temporarily stored in the distribution server 100, or the like, for each prediction product.

Referring to FIG. 3, the following information is stored in the metadata storage 14 for each prediction product as the meta information to be used at the prediction product recommender 23.

A mesh size

A period for prediction

A time interval of output values (a time interval of weather prediction data)

Information to be generated at the weather condition processor 22 (search result information) includes the following information for each prediction product as described above.

A target period

One or more points

One or more weather variables

The prediction product recommender 23 determines whether two or more corresponding prediction products exist for the same point and the same weather variable, and in a case where two or more corresponding prediction products do not exist, provides the information generated at the weather condition processor 22 to the output processor 30. On the other hand, in a case where two or more corresponding prediction products exist for the same point and the same weather variable, the prediction product recommender 23 performs the following processing.

First, a list of sets of the same points and the same weather variables is created for each prediction product and temporarily stored. The list may be stored in an arbitrary storage within the distribution server 100 or an external storage device which can be accessed from the distribution server 100.

Then, the following function f( ) is calculated for each set within the list.

f (a mesh size, a period for prediction, a time interval of output values)

f( ) is a function of at least one of the mesh size, the period for prediction or the time interval of output values. For example, f( ) is a function of the mesh size and outputs a smaller value as the mesh size is smaller. Alternatively, f( ) is a function of the period for prediction and outputs a smaller value as the period for prediction is smaller. Alternatively, f( ) is a function of the time interval of output values and outputs a smaller value as the time interval of output values is smaller.

The prediction product recommender 23 specifies a prediction product for which a calculation value of the function is the smallest for each set and sets the specified prediction product as a prediction product to be recommended for each set.

The prediction product recommender 23, for example, determines to recommend a prediction product for which the mesh size is the smallest. In a case where there are a plurality of candidates, the prediction product recommender 23 determines to recommend a prediction product for which the period for prediction is the smallest among the candidates. In a case where there are still a plurality of candidates, the prediction product recommender 23 determines to recommend a prediction product for which the time interval of output values is the smallest.

The prediction product recommender 23 transmits a selection request for requesting selection of a prediction product for each of the above-described sets to the client terminal 400. The prediction product recommender 23 puts recommendation information as to which prediction product is to be recommended for each set in the selection request to be transmitted. Note that the recommendation information does not have to be included in the selection request. In this case, the user only has to select a prediction product on his/her judgement without using the recommendation information. The prediction product recommender 23 or the distribution server 100 includes a transmitter that transmits the selection request.

In a case where the selection request is not transmitted, the output processor 30 transmits the information (search result information) generated at the weather condition processor 22 to the client terminal 400. In a case where the selection request is transmitted, the output processor 30 receives a selection response from the client terminal 400 and changes the information generated at the weather condition processor 22 on the basis of the received selection response. In other words, overlapping of sets of the same points and the same weather variables among the prediction products is eliminated. The output processor 30 transmits the changed information to the client terminal 400 as the search result information. The selection response includes information as to which prediction product is to be selected for the sets of the same point and the same weather variable. The output processor 30 includes, for example, a transmitter that transmits information or data and a receiver that receives information or data.

In a case where an acquisition request of the weather prediction data is received from the client terminal 400, the output processor 30 acquires the requested weather prediction data from the weather prediction DB 15 and transmits the acquired weather prediction data to the client terminal 400. The acquisition request of the weather prediction data includes, for example, information notified with the search result information, that is, information that specifies the weather prediction data to be acquired. The weather prediction data may be, for example, provided in a file format for each prediction product, for each point, and for each weather variable.

Usage examples of the present system will be described below assuming that the meta information stored in the metadata storage 14 has content illustrated in FIG. 3.

First Usage Example

A case will be considered where the user acquires the past weather prediction data as input data to the prediction model that predicts an amount of wind-generated power (event) corresponding to the next one day (24 hours) at a point XX at 17 o'clock every day or data for generating the prediction model.

FIGS. 4A and 4B is a diagram for explaining operation of the time point input device 41 and the time point processor 21 in the first usage example of the system in FIG. 1.

FIG. 4A illustrates a screen on which the user inputs a reference time point and a period for prediction using the time point input device 41. A unit of a period is set as one hour (h). When the user inputs information such as the reference time point and the period for prediction using an input device (such as a keyboard, a mouse and a touch panel) at the client terminal 400 and depresses a transmission button, the information is transmitted to the distribution server 100. The time point processor 21 of the distribution server 100 sets the reference time point $t_0=17$, a range of the period for prediction $[t_i, t_f]=[7, 31]$, and $t_{ML}=0$ on the basis of the input information from the user. A start time point of the next day is 00:00 seen from the time point of 17:00, and it is 7 hours later, and thus, $t_i=7$. 24 hours after $t_i=7$ is $t_f=31$.

A specific example of the above-described processing in steps X1 to X4 of the time point processor 21 will be described for a prediction product A.

In FIG. 3, the weather prediction start time point $t^w_0=21$, the cycle (prediction frequency) $\delta=24$, and thus, $t_0+t_i-t^w_0$ $(=17+7-21=3)$, and this value belongs to a range $[0, \delta)$. Thus, in this example, it is not necessary to add an integral multiple of $\delta$ to $t_0$. Note that this can be considered as addition of 0 times of $\delta$ to $t_0$.

A solution of n which satisfies expression (1) is obtained. The generation period of the weather prediction data in FIG. 3 $t^w_r=6$, and the period for weather prediction $t^w=168$, and thus, $6<=17-21+n*24<=168-31$, which can be rearranged to $6<=n*24-4<=137$. Thus, n=1, 2, 3, 4 and 5.

n can be obtained as n=1, 2, 3, 4 and 5 in a similar manner for a prediction product C. A solution of n does not exist for a prediction product B. For example, as illustrated in FIG. 3, the period for prediction is short (six hours) in the prediction product B, and thus, the condition input by the user cannot be supported with the prediction product B.

A minimum of n can be obtained as n=1 for the prediction products A and C. The period for prediction $[t^w_i, t^w_f]$ from the prediction start time point can be obtained as follows for n=1 from expression (2a) and expression (2b).

$$t^w_i=1*24+17+7-21=27$$

$$t^w_f=1*24+17+31-21=51$$

FIG. 4B indicates the period for prediction calculated for n=1 for the prediction products A and C and further indicates the periods for prediction for n=2 to 5. n=1 or the period for prediction [27, 51] respectively calculated for at least the prediction products A and C is temporarily stored in the distribution server 100.

FIGS. 5A and 5B are diagrams for explaining operation of the weather condition processor 22, the prediction product recommender 23 and the output processor 30 in the first usage example of the system in FIG. 1.

FIG. 5A illustrates a screen to which the user inputs a target period, a target point and target weather variables of the past weather prediction data to be used as an input to the prediction model using the weather condition input device 42. In the present example, the period input by the user is 2015/1/1 to 2019/12/31. Further, the point (the point XX or a point near the point XX) input by the user is an AMEDAS point (Akutsu). The weather variables input by the user are a temperature, wind speed, a wind direction, turbulent intensity and an atmosphere pressure. If the user depresses a transmission button, the information indicated on the screen of FIG. 5A is transmitted to the distribution server 100.

FIG. 5B illustrates an example of information (search result information) to be output as a processing result of the weather condition processor 22. An example where the information is generated through processing by the weather condition processor 22 will be indicated below.

From a value (=27) of $t^w_i$ and the above expression (3), ranges (periods) of the prediction start time points of the prediction products A and C become both 2014/12/30, 21:00 to 2019/12/29, 21:00. In other words, 27 hours before 2015/1/1 is 2014/12/30, 21:00, and 27 hours before 2019/12/31 (0 o'clock) is 2019/12/29, 21:00.

The above-described period (2014/12/30, 21:00 to 2019/12/29, 21:00) is included in periods (see FIG. 3) during which data exists of the prediction products A and C, and thus, the prediction products A and C are maintained as candidates.

Then, the weather variables (the temperature, the wind speed, the wind direction, the turbulent intensity, and the atmosphere pressure) input by the user are included in the weather variable list (see FIG. 3) of the product A, but not included in the weather variable list of the prediction product C, and thus, the prediction product C is excluded from the candidates.

As described above, the past weather prediction data to be acquired by the user is uniquely determined (there is no overlapping of the same points and the same weather variables among the prediction products). Thus, the prediction product recommender 23 does not request the user to select the prediction product. The output processor 30 outputs meta information indicating a period (2014/12/30, 21:00 to 2019/12/29, 21:00) during which prediction is started, the period for prediction (27 hours to 51 hours), the point (Akutsu) and the weather variables (the temperature, the wind speed, the wind direction, the turbulent intensity and the atmosphere pressure) extracted from the prediction product A as the search result information.

Thereafter, the client terminal 400 or a computer may perform the following processing on the basis of an instruction of the user. For example, the client terminal 400 acquires the weather prediction data having weather variables (the temperature, the wind speed, the wind direction, the turbulent intensity and the atmosphere pressure) at the point (Akutsu), within the period for prediction (27 hours to 51 hours), predicted at 21:00 on each date within the period indicated by the meta information as the search result from the distribution server 100. The client terminal 400 predicts an amount of wind-generated power corresponding to the next one day (24 hours) using the acquired weather prediction data as input data to the prediction model. The client terminal 400 may generate the prediction model on the basis of part of the acquired weather prediction data and actual data of the amount of wind-generated power. The client terminal 400 may predict the amount of wind-generated power corresponding to the next one day (24 hours) on the basis of the generated prediction model and the remaining part of the acquired weather prediction data. Prediction using the prediction model and generation of the prediction model can also be performed in a similar manner in the following other usage examples.

Second Usage Example

A case will be considered where the user acquires the past weather prediction data as input data to a prediction model that predicts a water volume flowing in dam YY for the next 90 hours at 6 o'clock every morning or as data for generating the prediction model.

Figure 6B:
FIGS. 6A and 6B each is a diagram for explaining a second usage example of the system in FIG. 1.
Figure 6A:
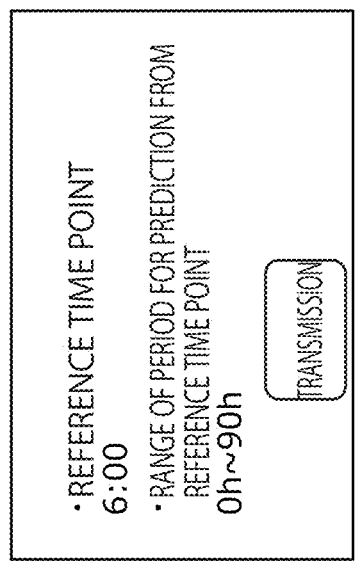

FIGS. 6A and 6B is a diagram for explaining operation of the time point input device 41 and the time point processor 21 in the second usage example of the system in FIG. 1.

FIG. 6A illustrates a screen to which the user inputs a reference time point and a period for prediction using the time point input device 41. If the user depresses a transmission button, the input information within the screen illustrated in FIG. 6A is transmitted to the distribution server 100. The time point processor 21 of the distribution server 100 sets the reference time point $t_0=6$, a range of the period for prediction $[t_i, t_f]=[0, 90]$ and $t_{ML}=0$ on the basis of the input information from the user.

A specific example of the above-described processing from steps X1 to step X4 of the time point processor 21 will be described for the prediction product A. In FIG. 3, the weather prediction start time point $t^w_0=21$, the cycle (prediction frequency) $\delta=24$. $t_0+t_i-t^w_0$ $(=6+0-21=-15)<0$, and this value does not belong to the range $[0, \delta)$. Correction of adding an integral multiple of $\delta$ to $t_0$ is performed to make $t_0$ 30 $(t_0+\delta=30)$.

A solution of n which satisfies expression (1) is obtained in a similar manner to the first usage example on the basis of the corrected $t_0$ (=30). The generation period of the weather prediction data $t^w_r=6$, and the period for weather prediction $t^w=168$, and thus, $6<=30-21+n*24<=168-90$, which can be rearranged as $6<=9+n*24<=78$. Thus, n=0, 1 and 2.

n=0, 1 and 2 can be obtained in a similar manner for the prediction product C. A solution of n does not exist for the prediction product B.

A minimum n for the prediction products A and C can be obtained as n=0. The period for prediction $[t^w_i, t^w_f]$ from the weather prediction start time point can be obtained as follows for n=0 from expression (2a) and expression (2b).

$t^w_i=0*24+30+0-21=9$ $t^w_f=0*24+30+90-21=99$

FIG. 6B indicates the periods for prediction calculated for n=0 for the prediction products A and C and further indicates the periods for prediction calculated for n=1 and 2. n=1 or the period for prediction [9, 99] respectively calculated for at least the prediction products A and C is temporarily stored in the distribution server 100.

FIGS. 7A and 7B are diagrams for explaining operation of the weather condition processor 22, the prediction product recommender 23 and the output processor 30 in the second usage example of the system in FIG. 1.

FIG. 7A illustrates a screen to which the user inputs a target period, target points and target weather variables of the past weather prediction data to be used as an input to the prediction model using the weather condition input device 42. In the present example, the period input by the user is 2015/1/1 to 2019/12/31. Further, the points input by the user (the point YY or a point near the point YY) are Kamioka (AMEDAS point) and Nakayamabashi (river observation point). The weather variables input by the user are a precipitation amount, a temperature, an amount of solar irradiance, a river flow rate and a river level. If the user depresses a transmission button, the input information within the screen illustrated in FIG. 7A is transmitted to the distribution server 100.

FIG. 7B illustrates an example of information (search result information) to be output as a processing result of the weather condition processor 22. An example will be described below where the information is generated through processing by the weather condition processor 22.

From a value (=9) of $t^w_i$ and the above expression (3), ranges (periods) of the prediction start time points of the prediction products A and C are both 2014/12/31, 21:00 to 2019/12/30, 21:00.

The above-described period (2014/12/31, 21:00 to 2019/12/30, 21:00) is included in the period during which data exists (see FIG. 3) of the prediction products A and C, and thus, the prediction products A and C are maintained as candidates.

Then, among the points and the weather variables input by the user, the precipitation amount, the temperature and the amount of solar irradiance at the Kamioka point are included only in the point list and the weather variable list (see FIG. 3) of the prediction product A. On the other hand, the river flow rate and the river level at the Nakayamabashi point are included only in the point list and the weather variable list of the prediction product C. While two prediction products A and C exist as candidates, the weather prediction data to be acquired by the user is uniquely determined (there is no overlapping of sets of the same points and the same weather variables between the both), and thus, the prediction product recommender 23 does not request the user to select the prediction product.

The output processor 30 outputs meta information indicating the period during which prediction is started, the period for prediction, the points and the weather variables extracted for the prediction product A and meta information indicating the period during which prediction is started, the period for prediction, the points and the weather variables extracted for the prediction product C as the search result information (see FIG. 7B).

Third Usage Example

A case will be considered where the user acquires the past weather prediction data as input data to a prediction model that predicts a water volume flowing in dam YY for the next three hours every hour on the hour or data for generating the prediction model.

Figures 8A, 8B:
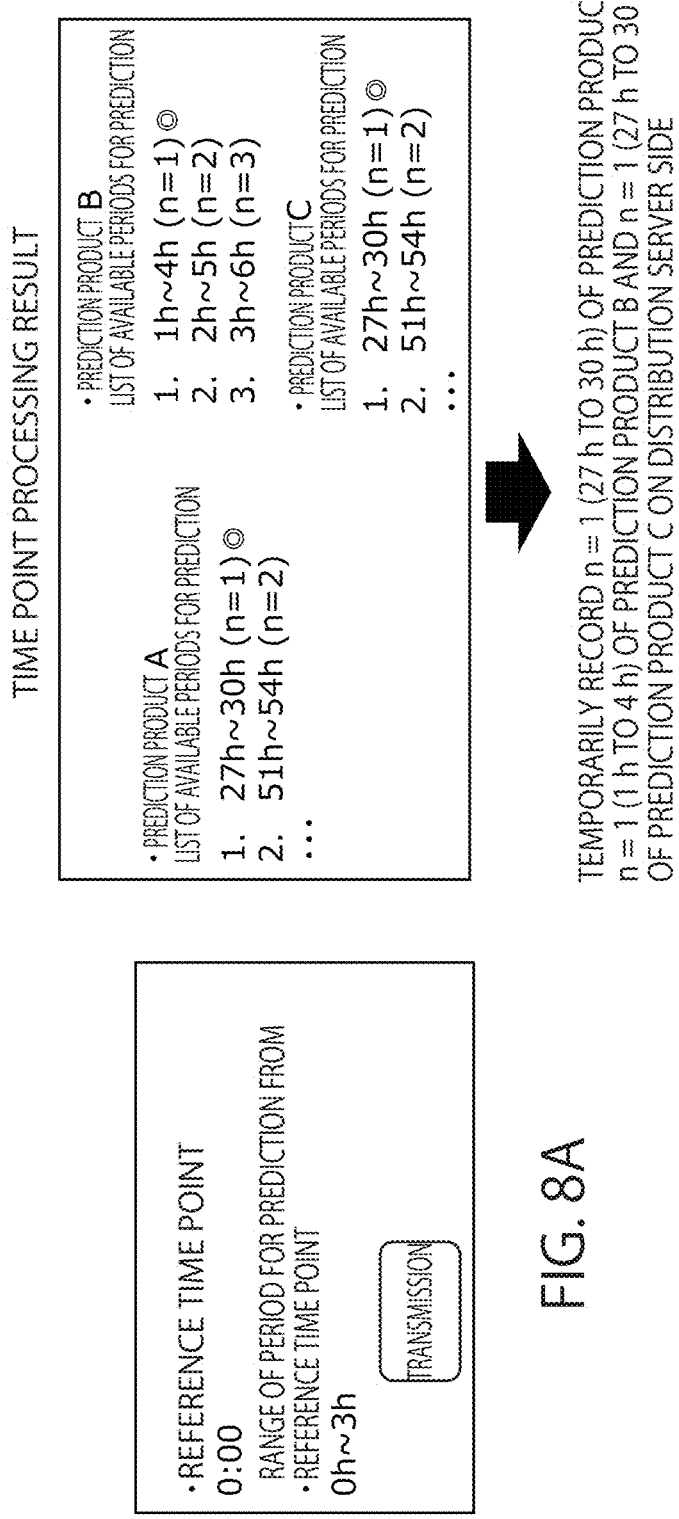
FIGS. 8A and 8B each is a diagram for explaining a third usage example of the system in FIG. 1.

FIGS. 8A and 8B are diagrams for explaining operation of the time point input device 41 and the time point processor 21 in the third usage example of the system in FIG. 1.

FIG. 8A illustrates a screen to which the user inputs a reference time point and a period for prediction using the time point input device 41. Note that while the user actually inputs 00 minute, in FIG. 8A, the reference time point is expressed as 0:00. While it is necessary to consider 24 ways of 0 o'clock to 23 o'clock in a case where 00 minute is input, here, only a case where the reference time point is 0 o'clock will be described. If the user depresses a transmission button, the input information within the screen illustrated in FIG. 8A is transmitted to the distribution server 100. The time point processor 21 of the distribution server 100 sets the reference time point $t_0=0$, sets a range of the period for prediction $[t_i, t_f]=[0, 3]$ and sets $t_{ML}=0$, on the basis of the input information from the user.

A specific example of the above-described processing from steps X1 to X4 of the time point processor 21 for the prediction product A will be described. In FIG. 3, the weather prediction start time point $t^w{}_0=21$, and the cycle (prediction frequency) $\delta=24$. $t_0+t_i-t^w{}_0$ $(=0+0-21=-21)<0$, and this value does not belong to the range $[0, \delta)$. Correction of adding an integral multiple of $\delta$ to $t_0$ is performed to make $t_0$ 24 ($t_0+\delta=24$).

A solution of n which satisfies expression (1) is obtained in a similar manner to the first usage example or the second usage example on the basis of the corrected $t_0$ (=24). The generation period of the weather prediction data $t^w{}_r=6$, and the period for weather prediction $t^w=168$, and thus, $6<=24-21+n*24<=168-3$, which can be rearranged as $6<=3+n*24<=165$. Thus, n=1, 2, 3, 4, 5 and 6.

n=1, 2, 3, 4, 5 and 6 is also obtained in a similar manner for the prediction product C.

n=1, 2 and 3 is obtained for the prediction product B. Note that in a case of the prediction product B, the weather prediction start time point $t^w{}_0=00$ minute in FIG. 3, and the cycle (prediction frequency) $\delta=1$. Further, correction of $t_0$ is not necessary, and thus, $t_0=0$.

A minimum n for each of the prediction products A, B and C can be obtained as n=1.

The period for prediction $[t^w{}_i, t^w{}_f]$ from the weather prediction start time point for n=1 can be obtained as follows for the prediction products A and C from expression (2a) and expression (2b).

$$t^w{}_i=n\delta+t_0+t_i-t^w{}_0=1*24+24+0-21=27$$

$$t^w{}_f=n\delta+t_0+t_f-t^w{}_0=1*24+24+3-21=30$$

The period for prediction $[t^w{}_i, t^w{}_f]$ from the weather prediction start time point for n=1 can be obtained as follows for the prediction product B from expression (2a) and expression (2b).

$$t^w{}_i=n\delta+t_0+t_i-t^w{}_0=1*1+0+0-0=1$$

$$t^w{}_f=n\delta+t_0+t_f-t^w{}_0=1*1+0+3-0=4$$

FIG. 8B indicates the period for prediction calculated for n=1 for the prediction products A and C and further indicates the period for prediction calculated for n=2 (indication of the period for prediction after n=3 is omitted).

FIG. 8B further indicates the period for prediction calculated for n=1 for the prediction product B and also indicates the periods for prediction calculated for n=2 and 3.

n=1 or the period for prediction [27, 30] respectively calculated for at least the prediction products A and C is temporarily stored in the distribution server 100. In a similar manner, n=1 or the period for prediction [1, 4] respectively calculated for at least the prediction product B is temporarily stored in the distribution server 100.

Figures 9A, 9B:
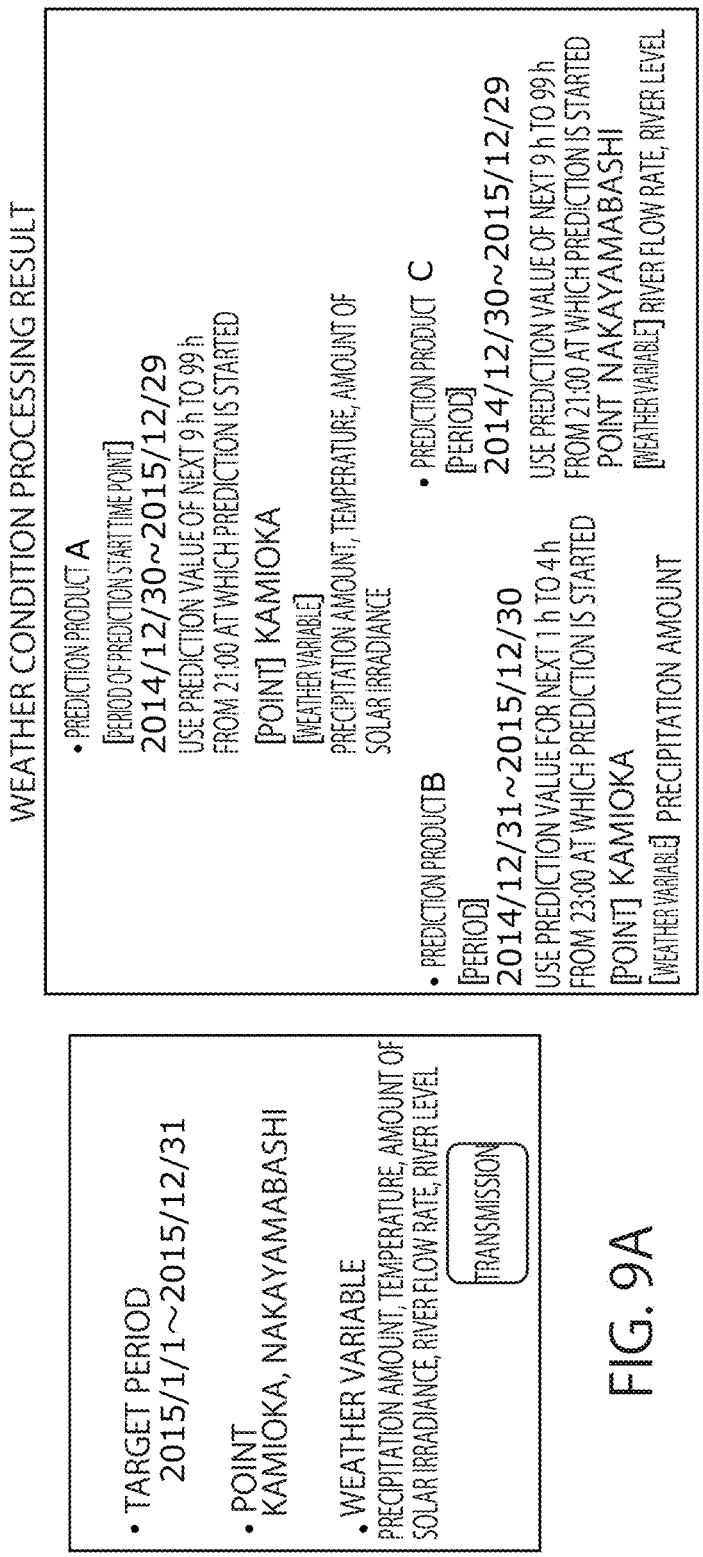
FIGS. 9A and 9B each is a diagram for explaining the third usage example of the system in FIG. 1.

FIG. 9A illustrates a screen to which the user inputs a target period, target points and target weather variables of the past weather prediction data to be acquired as an input to the prediction model using the weather condition input device 42. It is assumed that the user knows in advance which weather variable is required. In the present example, the period input by the user is 2015/1/1 to 2015/12/31. Further, the points (the point YY or a point near the point YY) input by the user are Kamioka (AMEDAS point) and Nakayamabashi (river observation point). The weather variables input by the user are a precipitation amount, a temperature, an amount of solar irradiance, a river flow rate and a river level. If the user depresses a transmission button, the input information within the screen illustrated in FIG. 9A is transmitted to the distribution server 100.

FIG. 9B illustrates an example of information (search result information) to be output as a processing result of the weather condition processor 22. An example where the information is generated through processing by the weather condition processor 22 will be described below.

From a value (=27) of $t^w{}_i$ and the above expression (3), ranges (periods) of the prediction start time points of the prediction products A and C are both 2014/12/30, 21:00 to 2015/12/29, 21:00.

The above-described period (2014/12/30, 21:00 to 2015/12/29, 21:00) is included in the periods during which data exists (see FIG. 3) of the prediction products A and C, and thus the prediction products A and C are maintained as candidates.

From a value (=1) of $t^w{}_i$ and the above expression (3), a range (period) of the prediction start time point of the prediction product B is 2014/12/31, 23:00 to 2015/12/30, 23:00.

The above-described period (2014/12/31, 23:00 to 2015/12/30, 23:00) is included in a period during which data exists (see FIG. 3) of the prediction product B, and thus, the prediction product B is maintained as a candidate.

Then, from the points and the weather variables input by the user, a temperature and an amount of solar irradiance of the Kamioka point are included only in the point list and the weather variable list (see FIG. 3) of the prediction product A. Further, a river flow rate and a river level of the Nakayamabashi point are included only in the point list and the weather variable list of the prediction product C. Further, a precipitation amount of the Kamioka point is included in the point lists and the weather variable lists of both the prediction products A and B.

The precipitation amount data of the Kamioka point is not uniquely determined, and thus, the prediction product recommender 23 transmits a selection request for selecting either the prediction product A or B to the client terminal 400. The prediction product recommender puts recommendation information indicating which of the prediction products is recommended in the selection request. As an example, the prediction product recommender 23 compares the meta information of the prediction products A and B and determines to recommend the prediction product B because a mesh size of the prediction product B is smaller than a mesh size of the prediction product A. The prediction product recommender 23 puts the recommendation information (the prediction product B) in the selection request indicating which of the prediction products A and B is to be selected for the precipitation amount of the Kamioka point and transmits the selection request to the client terminal 400.

Figures 10A, 10B:
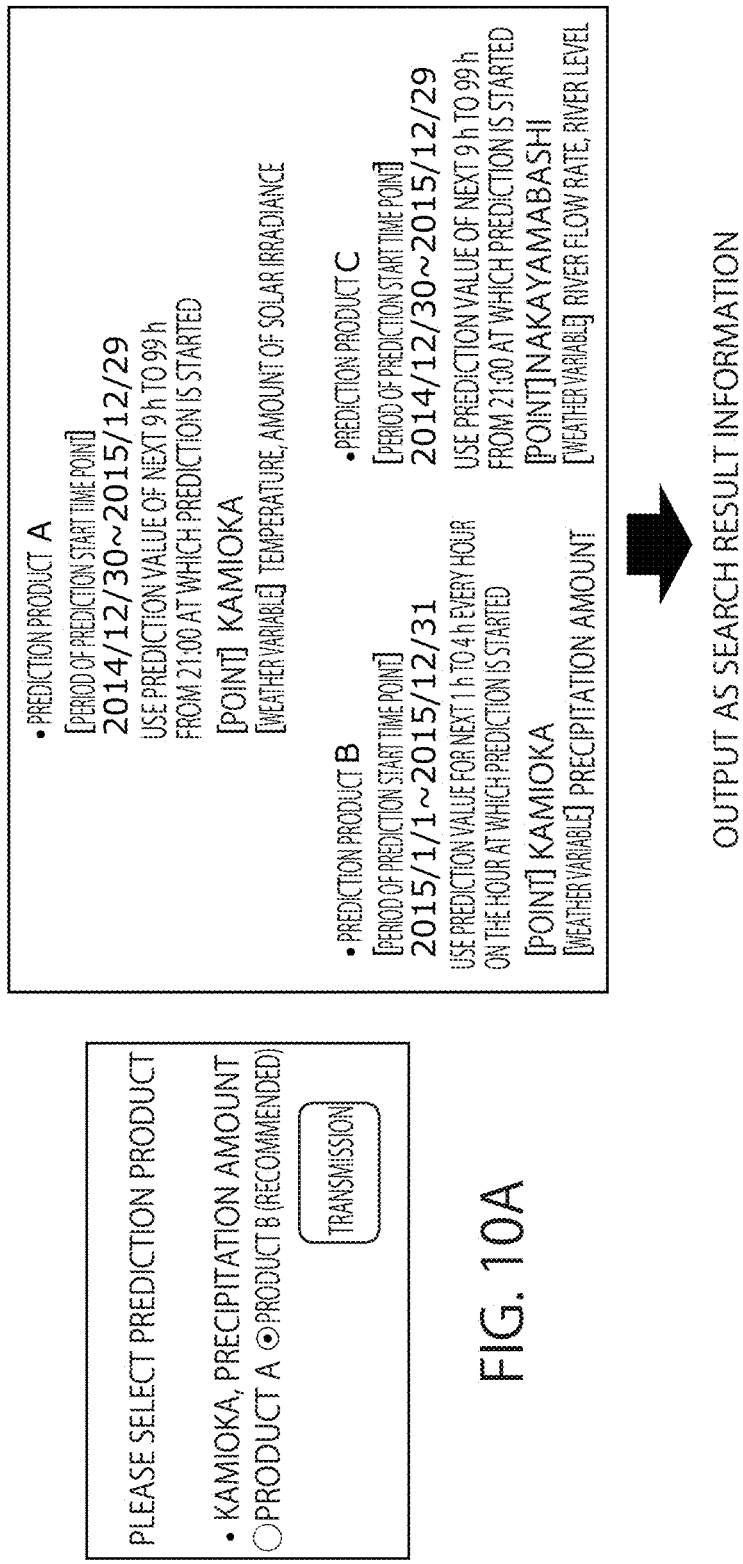
FIGS. 10A and 10B each is a diagram for explaining the third usage example of the system in FIG. 1.

FIG. 10A illustrates an example of the selection request to be transmitted to the client terminal 400. Content of the selection request is displayed on a screen of the client terminal 400. The user is requested to select from which of the prediction products A and B the precipitation amount of the Kamioka point is acquired. The recommendation information indicating the prediction product B is recommended is displayed on the screen.

The prediction product selector 43 acquires information indicating the prediction product selected by the user on the basis of operation by the user. The prediction product selector 43 transmits a selection response (selection result information) including information which identifies the prediction product selected by the user to the distribution server 100.

The output processor 30 selects the prediction product A or B on the basis of the selection result information by the user for the precipitation amount of the Kamioka point. The output processor 30 eliminates overlapping by deleting the precipitation amount from the weather variables for the prediction product A among the information (search result information) generated by the weather condition processor 22.

FIG. 10B illustrates an example where the weather variable of the precipitation amount regarding the prediction product A is deleted from the information generated by the weather condition processor 22. The output processor 30 outputs the search result information after deletion to the client terminal 400.

Figure 11:
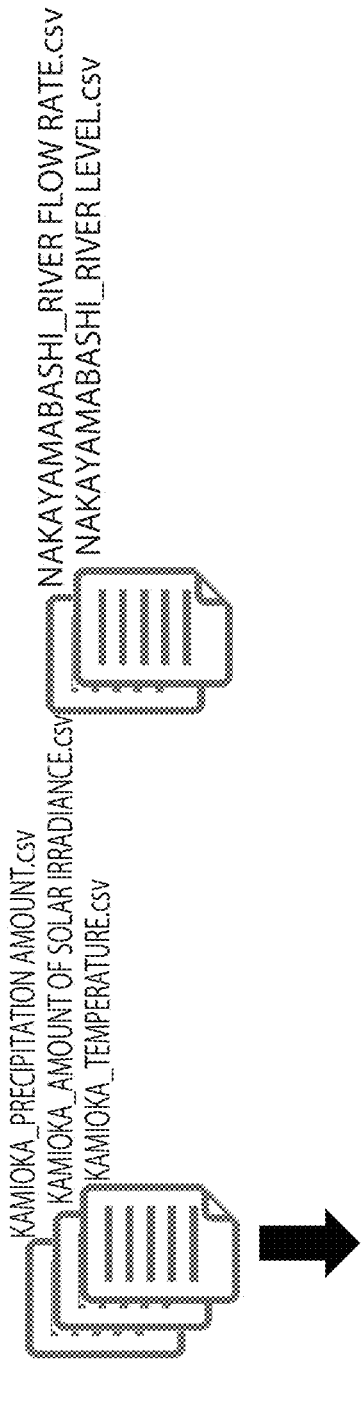
FIG. 11 is a diagram illustrating an example of weather prediction data to be acquired by a user.

FIG. 11 illustrates an example where the user acquires the weather prediction data on the basis of the search result information (output information) of the output processor. This example is an example of the weather prediction data which is acquired on the basis of the search result information in the third usage example.

The user transmits an acquisition request of the weather prediction data based on the search result information to the distribution server 100 using the client terminal 400, and the distribution server 100 transmits the weather prediction data requested from the client terminal 400 to the client terminal 400.

The weather prediction data is provided as a file for each point and each weather variable as an example. Specifically, a file of prediction data of the precipitation amount of the Kamioka point, a file of the prediction data of the amount of solar irradiance of the Kamioka point, a file of the prediction data of the temperature of the Kamioka point, a file of the prediction data of the river flow rate of the Nakayamabashi point, and a file of the prediction data of the river level of the Nakayamabashi point are provided. In each file, the weather prediction data including columns of the meta information of the prediction product, the reference time point from a viewpoint of the user and the period for prediction from the reference time point is stored. FIG. 11 illustrates an example of content of the file of the prediction data of the temperature of the Kamioka point.

The user can cause a computer to execute prediction processing of an arbitrary event using data of the five files illustrated in FIG. 11 as input data to the prediction model. Examples of a disaster include prediction of a possibility of flooding at the Kamioka point.

Further, the user can also cause the computer to generate a prediction model of an arbitrary event using the data of the five files illustrated in FIG. 11. To generate the prediction model, it is assumed that the user can separately acquire past actual data of an arbitrary event (for example, occurrence history of flooding and past weather actual data at the Kamioka point). For example, a prediction model that predicts a possibility of flooding at the Kamioka point can be generated through machine learning using the past actual data and the data of the five files.

Figure 12:
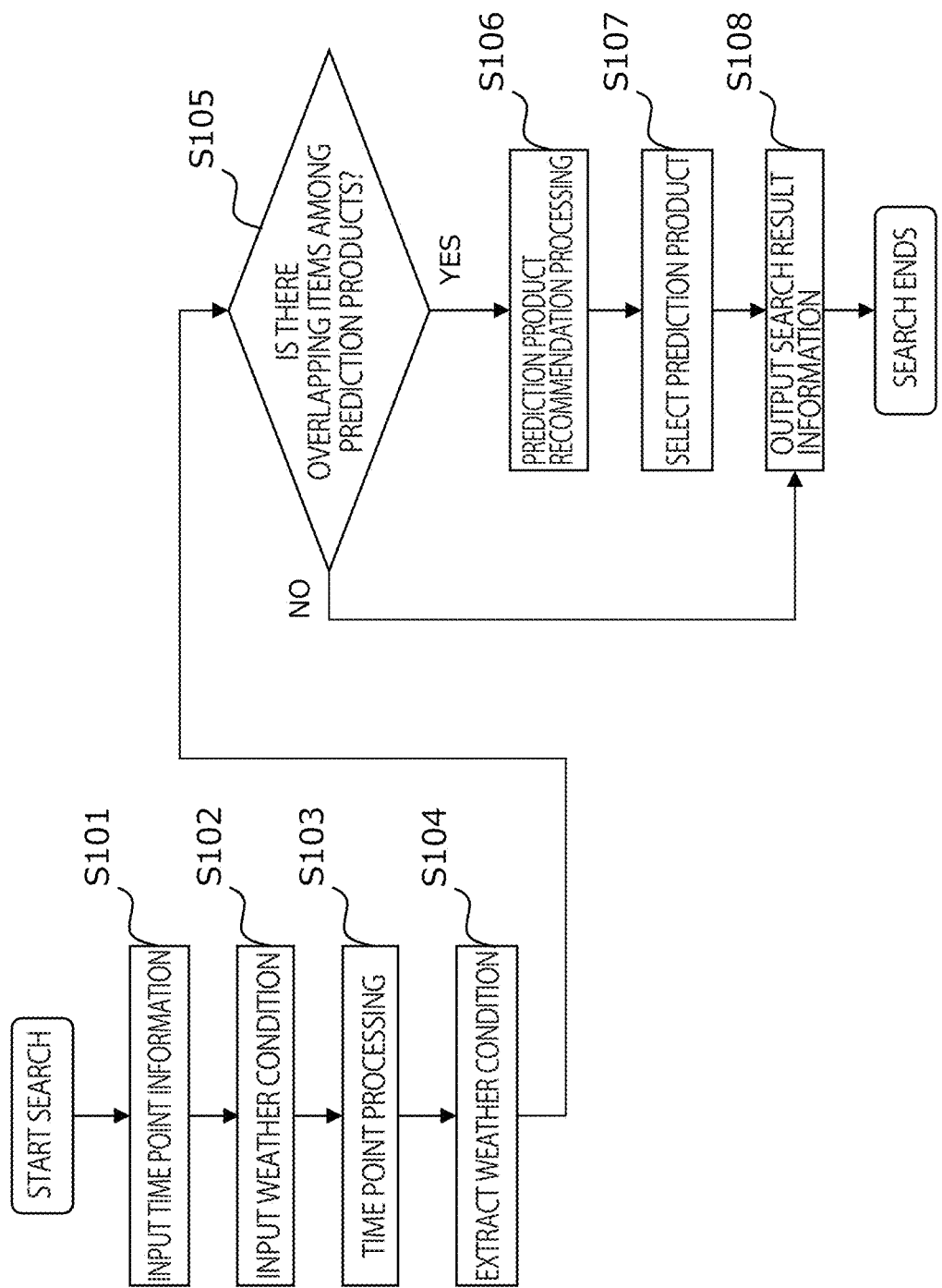
FIG. 12 is a flowchart illustrating an example of the whole operation of the system according to the first embodiment.

FIG. 12 is a flowchart illustrating an example of the whole operation of the system according to the first embodiment. The time point input device 41 at the client terminal 400 acquires time point information (such as a reference time point and a period for prediction) input from the user (S101), and the weather condition input device 42 acquires weather conditions (such as an input period (target period), points and weather variables) input from the user (S102). The client terminal 400 transmits the time point information and the weather conditions to the distribution server 100.

The time point processor 21 performs the above-described processing from steps X1 to X4 to calculate a minimum n, $t^w_i$ and $t^w_f$ for each prediction product (S103). The weather condition processor 22 performs the above-described processing in steps Y1 and Y2 on the basis of the minimum n, $t^w_i$ and $t^w_f$ and specifies a target period, target points and target weather variables for each prediction product (S104).

The prediction product recommender 23 determines whether there is overlapping of sets of the same points and the same weather variables among a plurality of prediction products (S105). In a case where there is no overlapping, the output processor 30 outputs information (meta information) indicating the target period, the target points and the target weather variables obtained for each prediction product as search result information (output information). The output processor 30 may cause the search result information to be displayed on the screen of the client terminal 400. The output processor 30 may acquire the weather prediction data indicated by the search result information from the weather prediction DB 15 and may transmit the acquired weather prediction data to the client terminal 400. The weather prediction data may be acquired and transmitted in a case where an acquisition request of the weather prediction data is received from the client terminal 400 or may be autonomously acquired and transmitted without an acquisition request being received.

In a case where there is overlapping of sets of the same points and the same weather variables among the plurality of prediction products, the prediction product recommender 23 determines a prediction product to be recommended on the basis of the meta information (such as, for example, mesh sizes) of the plurality of prediction products (S106). In a case where there are a plurality of sets of the same points and the same weather variables, a prediction product is recommended for each set. The prediction product recommender 23 puts recommendation information of recommending the determined prediction product in a selection request of requesting selection of one of the plurality of prediction products for the set and transmits the selection request to the client terminal 400 (S106).

The prediction product selector 43 at the client terminal 400 displays content of the selection request including the recommendation information on the screen and receives an instruction of selecting the prediction product from the user (S107). In a case where there are a plurality of sets of the same points and the same weather variables, the user selects a prediction product for each set. The prediction product selector 43 transmits information indicating the prediction product selected by the user for at least one set to the distribution server 100 (S107).

The output processor 30 eliminates overlapping of the above-described sets among the prediction products by selecting the prediction product selected by the user for the overlapping sets and then transmits the output information (search result information) generated for each prediction product to the client terminal 400.

In the above-described step S106, the prediction product recommender 23 does not have to put the recommendation information in the selection request. Alternatively, the prediction product recommender 23 may adopt the prediction product determined to be recommended without obtaining confirmation from the user and without transmitting either the recommendation information or the selection request.

As described above, according to the present embodiment, the weather prediction data required for predicting an event can be easily acquired without expertise regarding the weather prediction product. It is normally difficult for the user to acquire the past weather prediction data mainly in the following two points.

Definition of the period for prediction in the weather prediction product is different from definition of the period for prediction from the reference time point designated by the user. Further, in the weather prediction product, a period of processing (such as pre-processing, post-processing, execution and data transfer) is required for generating the weather prediction data. In other words, the weather prediction product generates weather prediction data and cannot provide the weather prediction data during a processing period from when the weather prediction is started. Thus, normally, the user requires to have knowledge regarding the period for prediction and the processing period specific to weather prediction to acquire weather prediction data in an optimal period for prediction.

Further, in a case where there are a plurality of weather prediction products, the user often desires to select a weather prediction product optimal for prediction of an event. Further, there is also a case where it is necessary to combine a plurality of weather prediction products depending on combination of points and weather variables selected by the user. In a case where it is necessary to select one weather prediction product from a plurality of weather prediction products, the user has to understand in advance points and weather variables targeted by each prediction product and property (such as a mesh size) of each prediction product.

The user who cannot receive an appropriate advice from a weather expert has difficulty in being aware of the above-described two points and even if the user can be aware of the two points, has difficulty in understanding the two points. There is a possibility that the user may actually use inappropriate weather prediction data or not optimal weather prediction data in online prediction.

In the present embodiment, meta information of the weather prediction product which is capable of providing appropriate or optimal weather prediction data on the basis of the input information of the user is provided to the user as the output information (search result information). This enables the user to easily acquire weather prediction data optimal for predicting an event even if the user does not have expertise regarding the weather prediction product.

Second Embodiment

Figure 13:
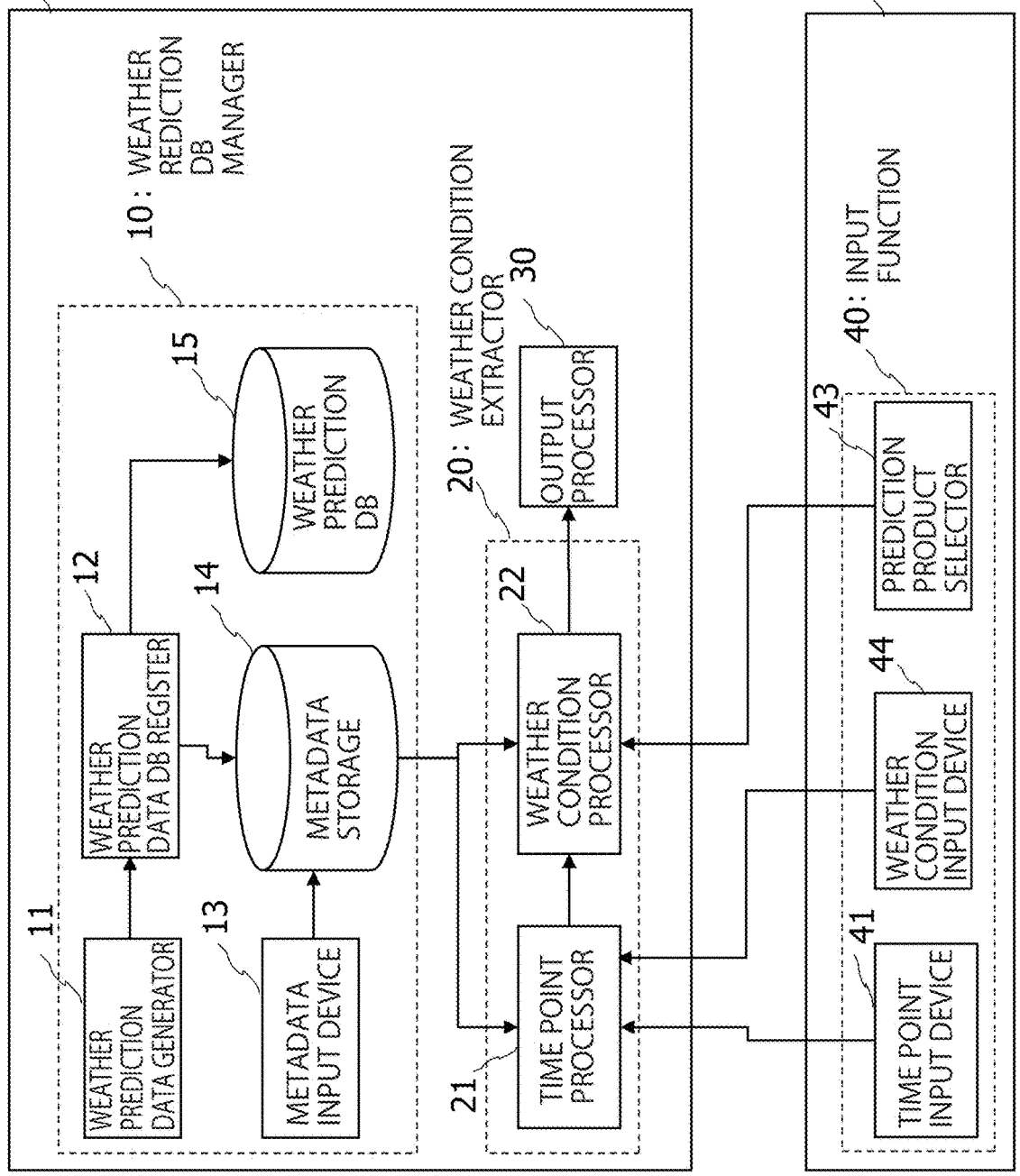
FIG. 13 is a block diagram of an information processing system according to a second embodiment.

FIG. 13 is a block diagram of an information processing system according to a second embodiment. The same reference numerals will be assigned to portions which are the same as or equivalent to the portions in FIG. 1, and description will be omitted except changed or extended processing.

The second embodiment is different from the first embodiment in that the prediction product recommender 23 is removed from the distribution server 100, the prediction product selector 43 is removed from the client terminal 400, and an ensemble condition input device 44 is added to the client terminal 400.

The time point processor 21 performs processing in step X1 (standardization of a gap) and step X2 (creation of a list of n) among the processing in four steps X1 to X4 in the first embodiment in a similar manner to the first embodiment and omits the processing in step X3 (extraction of a minimum n).

Further, the time point processor 21 obtains durations for prediction [twi, twf] from the weather prediction start time point respectively for all n obtained in expression (1) from expression (2) in step X4. twi, twf calculated for all n are temporarily stored in an arbitrary storage within the distribution server 100 or an external storage device which can be accessed from the distribution server 100.

The weather condition processor 22 performs the processing in step Y1 and step Y2 in a similar manner to the first embodiment. There is a case where the time point processor 21 acquires a plurality of sets of $t^w_i$, $t^w_f$ for each prediction product. Also in this case, the weather condition processor 22 performs processing respectively for the respective sets of $t^w_i$, $t^w_f$.

The weather condition processor 22 outputs meta information (a target period, target points and weather variables) of the weather prediction data obtained in the processing in step Y1 and step Y2 to the output processor 30 as output information (search result information).

The user may be able to select whether to extract a minimum n (that is, extract only optimal weather prediction data) or use all n (that is, extract all available weather prediction data) at the time point processor 21. Such a condition regarding n to be extracted is referred to as an ensemble condition. In a case where there are two or more n, that is, in a case where there are two or more prediction start time points (second time points), the time point processor 21 detects two or more prediction start time points and performs processing for each of the detected prediction start time points.

Usage Example

In a similar manner to the third usage example of the first embodiment, a case will be considered where the user acquires past weather prediction data required for prediction as input data to a prediction model that predicts a water volume flowing in dam YY for the next three hours every hour on the hour.

Figures 14A, 14B:
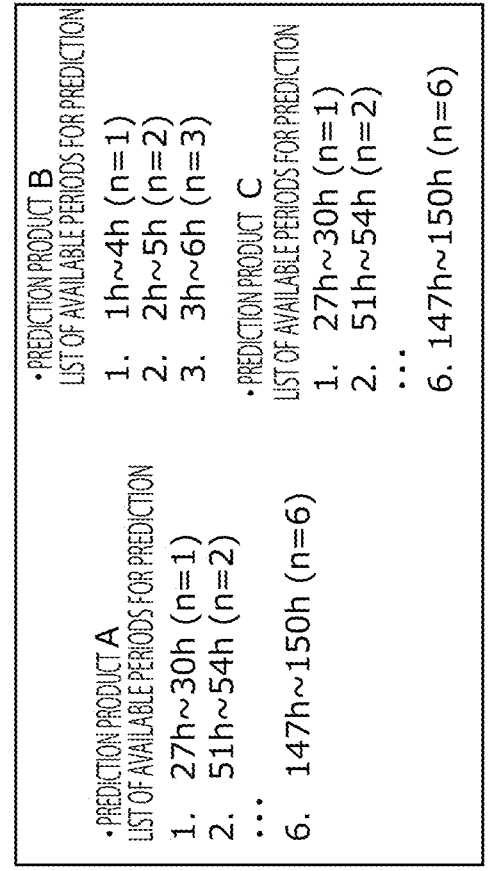
FIGS. 14A and 14B each is a diagram for explaining a usage example of the system according to the second embodiment.

FIGS. 14A and 14B 8B are diagrams for explaining operation of the time point input device 41 and the time point processor 21 in the second embodiment.

FIG. 14A illustrates a screen to which the user input a reference time point and a period for prediction using the time point input device 41. While the user actually inputs 00 minutes, 0:00 is expressed as the reference time point. While it is necessary to consider 24 ways of 0 o'clock to 23 o'clock in a case where 00 minute is input, here description will be provided in a case where the reference time point is 0 o'clock. Further, the user can input (select) an ensemble condition as to whether to extract a minimum n (that is, extract only optimal weather prediction data) or use all n (that is, extract all available weather prediction data) at the time point input device 41. In the present example, the user selects to use all n (that is, extract all available weather prediction data). If the user depresses a transmission button, the input information within the screen illustrated in FIG. 14A is transmitted to the distribution server 100. The time point processor 21 of the distribution server 100 sets the reference time point $t_0=0$, the period for prediction [$t^w_i$, $t^w_f$]=[0, 3], and $t_{ML}=0$ on the basis of the input information from the user.

n which satisfies expression (1) can be obtained as n=1, 2, 3, 4, 5 and 6 for both prediction products A and C and can be obtained as n=1, 2 and 3 for the prediction product B in a similar manner to the third usage example of the first embodiment.

Then, the durations for prediction from the weather prediction start time point are obtained for all n from expression (2a) and expression (2b). As a result, $t^w{}_i=27$ and $t^w{}_f=30$ for the prediction products A and C in a case where n=1, and $t^w{}_i=51$ and $t^w{}_f=54$ in a case where n=2. The durations for prediction are calculated in a similar manner in a case where n=3 and greater.

For the prediction product B, $t^w{}_i=1$ and $t^w{}_f=4$ in a case where n=1, and $t^w{}_i=2$ and $t^w{}_f=5$ in a case where n=2. The period for prediction is calculated in a similar manner also in a case where n=3.

FIG. 14B indicates the periods for prediction calculated in a case where n=1 to 6 for the prediction products A and C. Further, FIG. 14B indicates the periods for prediction calculated in a case where n=1 to 3 for the prediction product B. n=1 to 6 or the periods for prediction corresponding to n=1 to 6 respectively calculated for the prediction products A and C are temporarily stored in the distribution server 100. In a similar manner, n32 1 to 3 and the periods for prediction corresponding to n=1 to 3 calculated for the prediction product B are temporarily stored in the distribution server 100.

FIG. 15A illustrates a screen to which the user inputs a target period, target points and target weather variables of the past weather prediction data to be acquired as an input to the prediction model using the weather condition input device 42. It is assumed that the user knows in advance which weather variable is required. The information input by the user is similar to the information in the third usage example of the first embodiment. In other words, the period input by the user is 2015/1/1 to 2015/12/31. Further, the points input by the user (the point YY or the point near the point YY) are Kamioka (AMEDAS point) and Nakayamabashi (river observation point). The weather variables input by the user are a precipitation amount, a temperature, an amount of solar irradiance, a river flow rate and a river level. If the user depresses a transmission button, the input information within the screen illustrated in FIG. 15A is transmitted to the distribution server 100.

FIG. 15B illustrates an example of information (output information or search result information) to be output as a processing result of the weather condition processor 22. An example where the information is generated through processing by the weather condition processor 22 will be described below.

On the basis of a value of $t^w{}_i$ for each n and expression (3), ranges (periods) of prediction start time points of the prediction products A and C are both 2014/12/30, 21:00 to 2015/12/29, 21:00 in a case where n=1. Further, the ranges of prediction start time points are 2014/12/29, 21:00 to 2015/12/28, 21:00 in a case where n=2. The ranges of prediction start time periods are calculated in a similar manner also in a case where n=3 to 6.

A range (period) of a prediction start time point of the prediction product B is 2014/12/31, 23:00 to 2015/12/30, 23:00 in a case where n=1 and is 2014/12/31, 22:00 to 2015/12/30, 22:00 in a case where n=2. The range is calculated in a similar manner also in a case where n=3.

The periods calculated for n =1 to 6 for the prediction products A and C and the periods calculated for n=1 to 3 for the prediction product B are all included in the period during which data exists (see FIG. 3) of each prediction product. Thus, the prediction products A and C are maintained as candidates for all n=1 to 6, and the prediction product B is maintained as a candidate for n=1 to 3.

Then, the precipitation amount, the temperature and the amount of solar irradiance at the Kamioka point of the prediction product A, the precipitation amount at the Kamioka point of the prediction product B, and the river flow rate and the river level at the Nakayamabashi point of the prediction product C are specified on the basis of the points and the weather variables input by the user. This specified information becomes search result information regarding the points and the weather variables.

As described above, meta information indicating the periods extracted for n=1 to 6, the periods for prediction, the points and the weather variables is output (transmitted) to the client terminal 400 as the search result information (output information) for the prediction products A and C. The meta information indicating the period extracted for n=1 to 3, the period for prediction, the points and the weather variables is output (transmitted) to the client terminal 400 as the search result information (output information) for the prediction product B.

Figure 16:
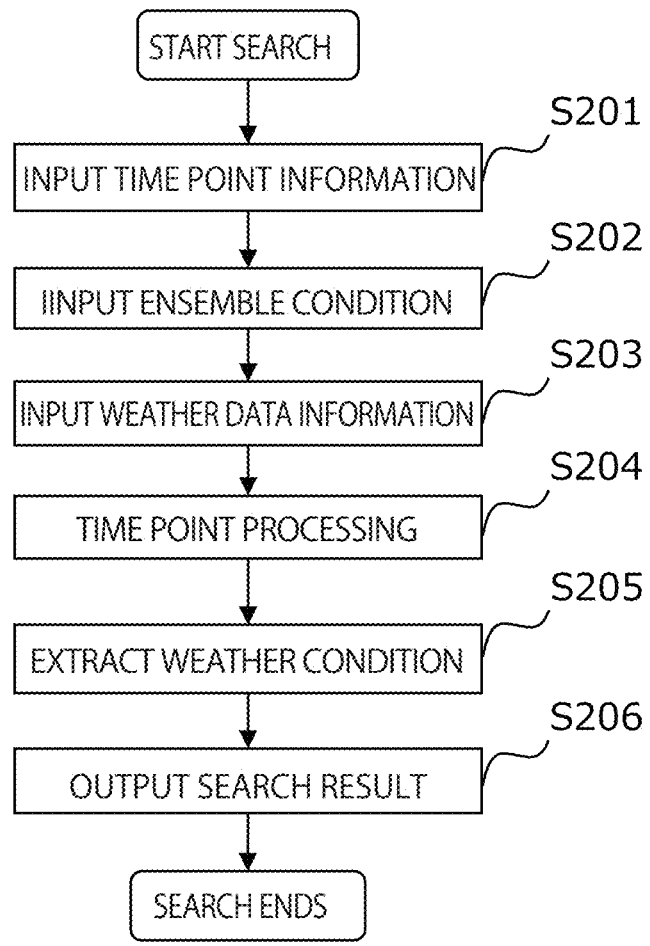
FIG. 16 is a flowchart illustrating an example of the whole operation of the system according to the second embodiment.

FIG. 16 is a flowchart illustrating an example of the whole operation of the system according to the second embodiment. Description similar to the description in the first embodiment will be omitted as appropriate. The time point input device 41 at the client terminal 400 acquires the time point information input from the user (S201). Further, the ensemble condition input device 44 acquires the ensemble condition input from the user (S202), and the weather condition input device 42 acquires the weather condition input from the user (S203). The client terminal 400 transmits the time point information, the ensemble condition and the weather condition input from the user to the distribution server 100. The ensemble condition includes a condition regarding n to be selected such as whether to target all n which satisfies expression (1) or select a minimum n in a case where there are a plurality of n which satisfies expression (1).

In a case where the ensemble condition indicates a condition that all n which satisfies expression (1) is targeted, the time point processor 21 performs the above-described processing in steps X1, X2 and X4, and in a case where the ensemble condition indicates a condition that a minimum n is targeted, the time point processor 21 performs the processing in steps X1 to X4 in a similar manner to the first embodiment (S204).

The weather condition processor 22 performs the above-described processing in steps Y1 and Y2 for each prediction product and specifies a target period of the prediction start time point, points and weather variables for which weather prediction data is to be acquired for each prediction product (S205). In a case where all n which satisfies expression (1) is targeted, the weather condition processor 22 specifies a target period of the prediction start time point, points and weather variables for which weather prediction data is to be acquired for each n.

The output processor 30 outputs information (the target period, the points and the weather variables for each prediction product and for each n) generated at the weather condition processor 22 to the client terminal 400 as the search result information (S206).

(Hardware Configuration)

Figure 17:
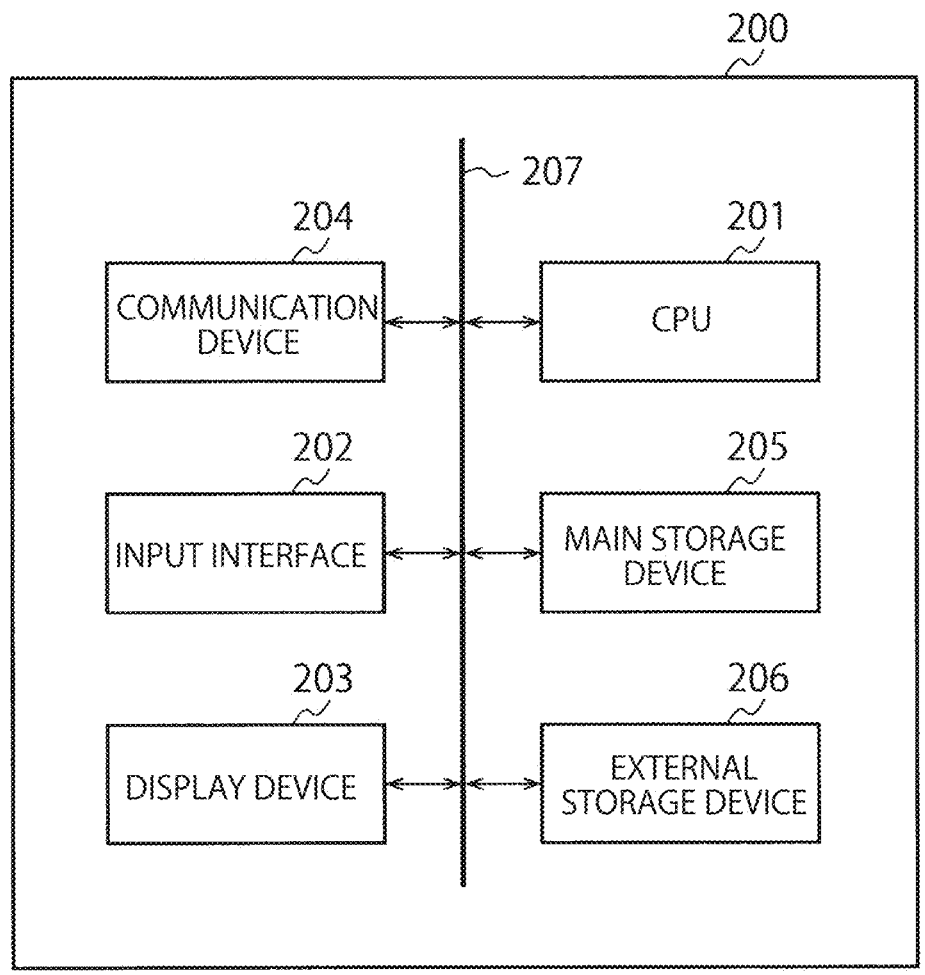
FIG. 17 is a diagram illustrating a hardware configuration of an information processing device according to embodiments of the present invention.

FIG. 17 illustrates a hardware configuration of the information processing device according to the embodiment. The information processing device is configured as a computer device 200. The computer device 200 includes a CPU 201, an input interface 202, a display device 203, a communication device 204, a main storage device 205, and an external storage device 206, and these components are mutually connected through a bus 207.

The CPU (central processing unit) 201 executes an information processing program as a computer program on the main storage device 205. The information processing program is a computer program configured to achieve each above-described functional component of the present device. The information processing program may be achieved by a combination of a plurality of computer programs and scripts instead of one computer program. Each functional component is achieved as the CPU 201 executes the information processing program.

The input interface 202 is a circuit for inputting, to the present device, an operation signal from an input device such as a keyboard, a mouse, or a touch panel. The input interface 202 corresponds to the inputter 105.

The display device 203 displays data output from the present device. The display device 203 is, for example, a liquid crystal display (LCD), an organic electroluminescence display, a cathode-ray tube (CRT), or a plasma display (PDP) but is not limited thereto. Data output from the computer device 200 can be displayed on the display device 203.

The communication device 204 is a circuit for the present device to communicate with an external device in a wireless or wired manner. Data can be input from the external device through the communication device 204. The data input from the external device can be stored in the main storage device 205 or the external storage device 206.

The main storage device 205 stores, for example, the information processing program, data necessary for execution of the information processing program, and data generated through execution of the information processing program. The information processing program is loaded and executed on the main storage device 205. The main storage device 205 is, for example, a RAM, a DRAM, or an SRAM but is not limited thereto. Each storage or database in the information processing device may be implemented on the main storage device 205.

The external storage device 206 stores, for example, the information processing program, data necessary for execution of the information processing program, and data generated through execution of the information processing program. The information processing program and the data are read onto the main storage device 205 at execution of the information processing program. The external storage device 206 is, for example, a hard disk, an optical disk, a flash memory, or a magnetic tape but is not limited thereto. Each storage or database in the information processing device may be implemented on the external storage device 206.

The information processing program may be installed on the computer device 200 in advance or may be stored in a storage medium such as a CD-ROM. Moreover, the information processing program may be uploaded on the Internet.

The present device may be configured as a single computer device 200 or may be configured as a system including a plurality of mutually connected computer devices 200.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device using a plurality of prediction products, the plurality of prediction products each start weather prediction at a plurality of weather prediction start time points arranged at prediction time intervals to generate weather prediction data for prediction periods beginning at each of the plurality of weather prediction start time points, data generation time being required to generate the weather prediction data in each prediction product, comprising:

a weather prediction storage configured to acquire and store the weather prediction data generated by each of the plurality of prediction products in association with the weather prediction start time points and the prediction period, a first processor configured to acquire, from a terminal of a user, first information including a reference time point and a target time point later than the reference time point, acquire, from a meta data storage, meta information for each of the plurality of prediction products, including the plurality of weather prediction start time points, a length of the data generation time, and a length of the prediction periods, select, from the plurality of prediction products, a prediction product having a first one of the weather prediction start time points which satisfies a condition that the prediction period includes the target time point and that the first one of the weather prediction start time points plus the length of the data generation time is earlier than the reference time point, and detect, among the weather prediction start time points which satisfy the condition with respect to the selected prediction product, a second one weather prediction start time point, which is closest to the reference time point; and an output processor configured to retrieve from the weather prediction storage a portion of the weather prediction data at the target time point in the weather prediction data generated by the selected prediction product for the prediction period starting from the detected second one of the weather prediction start times, and transmit the portion of the weather prediction data to the terminal, wherein in the terminal, the portion of the weather prediction data is used to execute a prediction model to predict occurrence of a predetermined event at the target time.

2. The information processing device according to claim 1, wherein the plurality of the prediction products generate the weather prediction data by calculating one or more weather variables, the information processing device further comprises a second processor configured to select a prediction product which calculates, among the one or more weather variables, at least one of target weather variables specified by second information acquired from the terminal, and the output processor acquires the target weather variables being the portion of the weather prediction data at the target time point generated by the selected prediction product.

3. The information processing device according to claim 2, wherein when a plurality of the prediction products are selected and a same target weather variable is included in the weather variables calculated by the prediction products, the output processor sends a selection request to the terminal instructing the user to select one of the prediction products to transmit the target weather variable calculated by the prediction product selected by the user to the terminal.

4. The information processing device according to claim 3,
wherein the plurality of prediction products calculate the one or more weather variables at one or more points each being a geographic location,
the second processor selects a prediction product that calculates the target weather variable at a target point specified by third information acquired from the terminal, and
the output processor acquires the target weather variable at the target point being the portion of the weather prediction data at the target time point generated by the selected prediction product.

5. The information processing device according to claim 4,
wherein when a plurality of the prediction products are selected and a same target weather variable at a same target point is included in the weather variables calculated by the prediction products, the output processor sends a selection request to the terminal instructing the user to select one of the prediction products to transmit the target weather variable calculated by the prediction product selected by the user to the terminal.

6. The information processing device according to claim 3, further comprising
a prediction product recommender configured to select one prediction product to be recommended among the selected prediction products on a basis of the meta information of the selected prediction products, and
wherein the selection request includes recommendation information of recommending the one prediction product, wherein
the prediction product recommender calculates a function that includes, as parameters, a mesh size, a point targeted for prediction by the prediction product, the length of the prediction period, and an output time interval of the weather prediction, and select the one prediction product with a smallest function value.

7. The information processing device according to claim 2,
wherein the first information includes a plurality of the target time points belonging on a plurality of past days,
the meta information of the plurality of prediction products includes information on data existence period, which is a period of time during which the weather prediction data was acquired from the plurality of prediction products, respectively, and
the first processor selects the prediction product that the data existence period includes all of the plurality of past days.

8. An information processing method using a plurality of prediction products, the plurality of prediction products each start weather prediction at a plurality of weather prediction start time points arranged at prediction time intervals to generate weather prediction data for prediction periods beginning at each of the plurality of weather prediction start time points, data generation time being required to generate the weather prediction data in each prediction product, the method comprising:
acquiring the weather prediction data generated by each of the plurality of prediction products in association with the weather prediction start time and the prediction period and storing acquired weather prediction data in a weather prediction storage;
acquiring, from a terminal of a user, first information including a reference time point and a target time point later than the reference time point;
acquiring, from a meta data storage, meta information for each of the plurality of prediction products, including the plurality of weather prediction start time points, a length of the data generation time, and a length of the prediction periods;
selecting, from the plurality of prediction products, a prediction product having the weather prediction start time point which satisfies a condition that the prediction period includes the target time point and that the weather prediction start time point plus the length of the data generation time is earlier than the reference time point;
detecting, among the weather prediction start time point, points which satisfy the condition with respect to the selected prediction product, one weather prediction start time point which is closest to the reference time point; and
retrieving from the weather prediction storage a portion of the weather prediction data at the target time point in the weather prediction data generated by the selected prediction product for the prediction period starting from the detected one weather prediction start time, and transmitting the portion of the weather prediction data to the terminal, wherein in the terminal, the portion of the weather forecast data is used to execute a prediction model to predict occurrence of a predetermined event at the target time.

9. A non-transitory computer readable medium having a computer program stored therein which when the computer program is executed by a computer, causes the computer to perform processes, using a plurality of prediction products, the plurality of prediction products each start weather prediction at a plurality of weather prediction start time points arranged at prediction time intervals to generate weather prediction data for prediction periods beginning at each of the plurality of weather prediction start time points, data generation time being required to generate the weather prediction data in each prediction product, the processes comprising:
acquiring the weather prediction data generated by each of the plurality of prediction products in association with the weather prediction start time and the prediction period and storing acquired weather prediction data in a weather prediction storage;
acquiring, from a terminal of a user, first information including a reference time point and a target time point later than the reference time point;
acquiring, from a meta data storage, meta information for each of the plurality of prediction products, including the plurality of weather prediction start time points, a length of the data generation time, and a length of the prediction periods;
selecting, from the plurality of prediction products, a prediction product having the weather prediction start time point which satisfies a condition that the prediction period includes the target time point and that the weather prediction start time point plus the length of the data generation time is earlier than the reference time point;
detecting, among the weather prediction start time point points which satisfy the condition with respect to the selected prediction product, one weather prediction start time point which is closest to the reference time point; and retrieving from the weather prediction storage a portion of the weather prediction data at the target time point in the weather prediction data generated by the selected prediction product for the prediction period starting from the detected one weather prediction start time, and transmitting the portion of the weather prediction data to the terminal, wherein in the terminal, the portion of the weather forecast data is used to execute a prediction model to predict occurrence of a predetermined event at the target time.

* * * * *